United States Patent [19]

Matsui et al.

[11] Patent Number: 4,696,167

[45] Date of Patent: Sep. 29, 1987

[54] AIR CONDITIONER FOR AUTOMOBILES

[75] Inventors: Katsumasa Matsui; Masahiro Ohba, both of Okazaki; Tohru Kakehi, Nagoya; Takayoshi Kawai, Anjo, all of Japan

[73] Assignee: Nippondenso Co., Ltd., Kariya, Japan

[21] Appl. No.: 789,013

[22] Filed: Oct. 18, 1985

[30] Foreign Application Priority Data

| Oct. 19, 1984 | [JP] | Japan | 59-220769 |
| Mar. 26, 1985 | [JP] | Japan | 60-62714 |
| Mar. 27, 1985 | [JP] | Japan | 60-64581 |
| Mar. 27, 1985 | [JP] | Japan | 60-64582 |
| Apr. 5, 1985 | [JP] | Japan | 60-73198 |

[51] Int. Cl.$^4$ ............... F25D 17/00; G05B 13/04
[52] U.S. Cl. ............... 62/180; 62/244; 364/151; 364/557
[58] Field of Search ........... 62/180, 243, 244, 239, 62/231, 157; 236/49, 78 D, 46 R, 46 C, 46 A; 165/42, 43, 44, 16, 12; 364/149, 150, 151, 557, 165

[56] References Cited

U.S. PATENT DOCUMENTS

| 4,054,780 | 10/1977 | Bartley et al. | 364/150 |
| 4,494,184 | 1/1985 | Crevel | 364/557 X |
| 4,563,734 | 1/1986 | Mori et al. | 364/150 X |
| 4,570,450 | 2/1986 | Takemi et al. | 62/243 X |

OTHER PUBLICATIONS

Melsa et al, *Linear Control Systems*, McGraw-Hill, N.Y., 1969, pp. 503–510.
Linear Optimal Control Systems—Kwakernaak & Sivan Control Systems Magazine—Oct. 1986—Automotive Climate Control—Tabe, Matsui, Kakehi, Ohba.

*Primary Examiner*—Harry Tanner
*Attorney, Agent, or Firm*—Cushman, Darby & Cushman

[57] ABSTRACT

In an air conditioner for automobiles, control unit for performing feedback control of blow off air is constructed in the form of an integral-added optimal regulator (M4) which performs the feedback control on the basis of optimal feedback gain predetermined according to dynamic model(s) of an air conditioning system including the vehicle compartment (M1) and the used air conditioning unit (M2). According to another feature of the present invention, an environmental condition, such as solar radiation to the vehicle compartment (M1), is detected to further accurately control the internal air temperature. In one embodiment, the internal variables including optimal feedback gain of the integral-added optimal regulator (M4) are changed in accordance with the variation in the dynamic model depending on the detected environmental condition. In another embodiment, in addition to the above-mentioned feedback gain, feedforward gain is used so as to finally determine controlled variables of blow off air control unit (M2). Furthermore, according to another feature of the present invention, temperature control may be performed at a plurality of different positions within a vehicle compartment using a plurality of air conditioning units without suffering from interference between a plurality of airflows.

19 Claims, 26 Drawing Figures

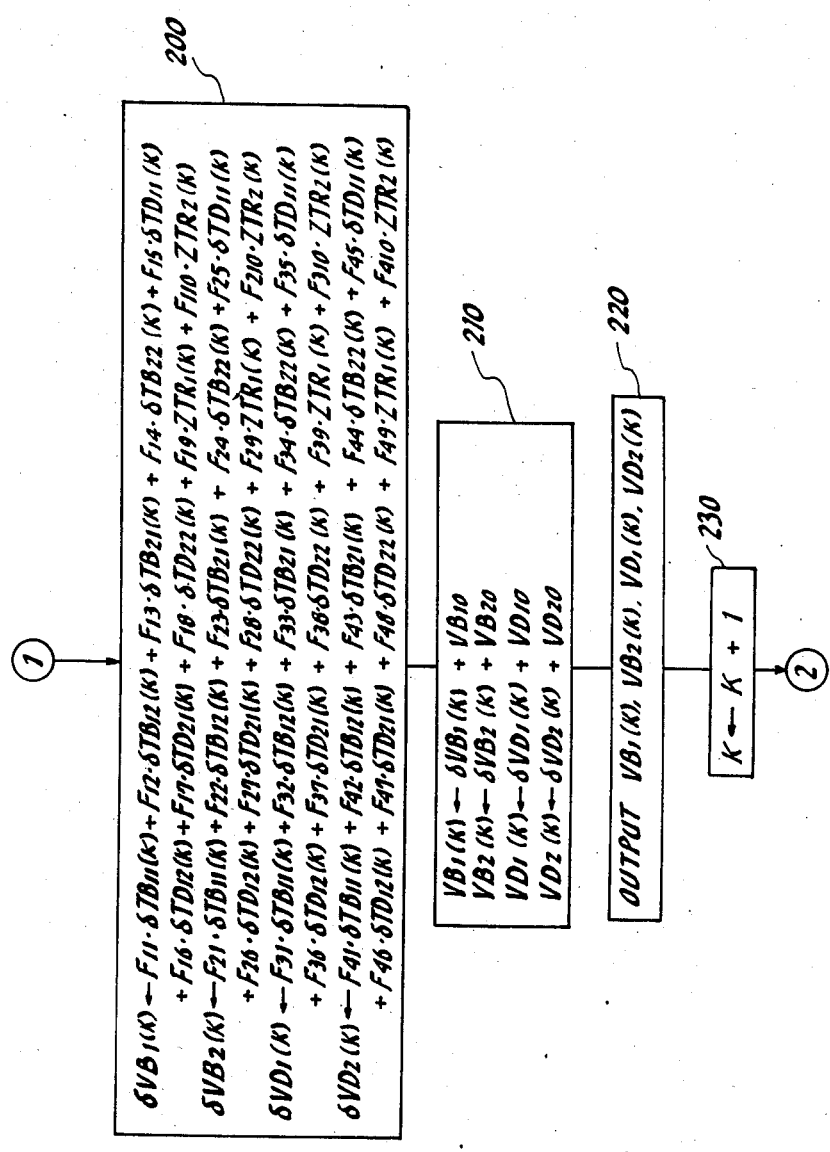

AIR CONDITIONER FOR AUTOMOBILES

BACKGROUND OF THE INVENTION

This invention relates generally to an air conditioning system for automobiles, and more particularly, to an automatic control system for such an air conditioner based on a dynamic model of the system.

Various types of air conditioning systems have been used and applied for automobiles so as to control the temperature, humidity, cleanness and so on of the air within a vehicle compartment. Among such various types, an air conditioning apparatus which controls only the temperature is widely used. In such air conditioning apparatus for automobiles, in order to control the air temperature at air outlets throughout a wide range from a low temperature to a high temperature, air sent in the apparatus is once cooled by a cooler, such as an evaporator, and then the cooled air is heated by a heater, such as a heater core, so as to obtain a desired temperature of the blowing air. This series of apparatus for blowing, cooling and heating air is referred to as blowing air control measure, and the entire system is referred to as an air conditioning unit. As such air conditioning unit widely used in these days as an air conditioner of automobiles there are two types, one being a reheat type which is arranged to change the calorific value supplied to a heater, and the other being air-mixing type which is arranged to change the ratio of air passing through the heater.

In either of these two types, the temperature of air within a vehicle compartment is controlled by the calorific value of blow off air, i.e. the flow rate and temperature of the blow off air. The flow rate of the blow off air is determined by the blowing capability of a blower motor or the like as used in the system, and the temperature thereof is determined by the cooling capability of the cooler (evaporator). That is, the capability of the cooling system including a compressor and heating capability of a heater, namely, the amount of circulated hot water in the case of reheat type and the damper opening degree of the air-mixing damper in the case of air-mixing type.

When an air conditioning unit starts operating, the temperature of air within a vehicle compartment is detected to feedback control the temperature and flow rate of blow off air on the basis of the difference between the detected temperature and a predetermined target temperature. As a result, the temperature of air within the vehicle compartment, which will be referred to as internal air temperature hereinafter, approaches the setting target temperature gradually, because of the calorific value of the blow off air.

Such a control of air temperature is disclosed in Japanse Patent Provisional Publications Nos. 55-47914 and 55-77659.

. The above-described conventional apparatus is based on feedback control which is performed on th basis of the deviation of a detected internal air temperature from a setting target temperature so that the former approaches the latter, and some conventional apparatus further adopts prediction control in which the amount of control is determined so that predetermined conditions of thermal equilibrium are satisfied considering the external air temperature and solar radiation amount. Furthermore, the amount of air to be blown off is just simply controlled such that the blow off air amount is increased when the above-mentioned deviation, that is the difference between the above-mentioned temperatures is large and to decrease the same as the difference becomes smaller.

Therefore, transient response at the time of the change of the setting value of the target temperature is not necessarily satisfactory, such that the transient response is poor depending on the internal air temperature at such instant, the capability of the air conditioning unit, and therefore, there have been a problem that it is difficult to provide comfortable environment to vehicle occupants. Furthermore, when environmental conditions, such as solar radiation, of the system where air conditioning is performed are changed, conventional control is apt to deviate from thermal equilibrium state and therefore, it takes a relatively long period of time until the internal air temperature is stably set at a target temperature. In other words, conventional control apparatus are not necessararily optimal when environmental condition varies.

While the capability of an air conditioning unit is determined by the combination of blow off air amount, cooling capability of the cooler, heating capability of the heater and so on, it has not been made clear as to what combination of these factors provides an optimal control. Therefore, these factors have hitherto been combined simply by the experiences of designers as the above-mentioned control of blow off air amount. Accordingly, it cannot be said that the capability of air conditioning unit has hitherto been derived sufficiently.

The present invention has been made so as to resolve such problems, and contemplates to provide an air conditioner for automobiles, which controls the temperature (internal air temperature) within vehicle compartment deriving fully the capability of a used air conditioning unit.

Moreover, when an air conditioner for automobile is arranged so that respective air discharge outlets can be independently controlled, it is desired that temperatures at a plurality of different places within a vehicle compartment can be controlled to be respectively equal to setting target tempeatures which are predetermined individually. In detail, while some air conditioners of recent motor vehicles are capable of controlling temperatures at given different positions within the vehicle compartment, such as front seat and rear seat, left seat and right seat, or upper portion and lower portion, by way of a so called dual-air conditioner having two air conditioning units at the front and rear portions of the vehicle compartment, or by way of an air conditioner which is capable of controlling airflow rate and temperature of air at respective discharge outlets from which air conditioned air is discharged into the vehicle compartment, the response in temperature control is poor, and a plurality of airflows from different discharge outlets interfere with each other so that it is very difficult to provide desired internal air temperatures at each of the given positions.

The present invention contemplates to provide an air conditioner which is capable of controlling temperatures at a plurality of positions within a vehicle compartment with high response so that desired temperatures can be provided.

SUMMARY OF THE INVENTION

The present invention has been developed in order to remove the above-described drawbacks inherent to the conventional air conditioner for automobiles.

It is, therefore, an object of the present invention to provide a new and useful air conditioner for automobile, with which temperature is optimally controlled by fully deriving the capability of an used air conditioning unit.

According to a feature of the present invention control means for performing feedback control of blow off air is constructed in the form of an integral-added optimal regulator which performs the feedback control on the basis of optimal feedback gain predetemined according to dynamic model(s) of an air conditioning system including the vehicle compartment and the used air conditioning unit.

According to another feature of the present invention, an environmental condition, such as solar radiation to the vehicle compartment, is detected to further accurately control the internal air temperature. In one embodiment, the internal variables including optimal feedback gain of the integral-added optimal regulator are changed in accordance with the variation in the dynamic model depending on the detected environmental condition. In another embodiment, in addition to the above-mentioned feedback gain, feedforward gain is used so as to finally determine controlled variables of blow off air control means.

Furthermore, according another feature of the present invention, temperature control may be performed at a plurality of different positions within a vehicle compartment using a plurality of air conditioning units without suffering from interference between a plurality of airflows.

In accordance with the present invention there is provided an air conditioner for automobiles comprising: blow off air control means for controlling at least temperature and flow rate of blow off air discharged into a vehicle compartment; internal air temperature detecting means for detecting the temperature within said vehicle compartment; and air conditioning control means for feedback controlling said blow off air control means so that said detected internal air temperature equals a setting target temperature, said air conditioning control means being formed as an intergral-added optimal regulator which performs said feedback control on the basis of optimal feedback gain predetermined according to dynamic models of an air conditioning system including said vehicle compartment and said air conditioner.

BRIEF DESCRIPTION OF THE DRAWINGS

The object and features of the present invention will become more readily apparent from the following detailed description of the preferred embodiments taken in conjunction with the accompanying drawings in which:

FIGS. 22A and 22B show a flowchart used for the fourth embodiment; and

The same or corresponding elements and parts are designated at like reference numerals throughout the drawings.

DETAILED DESCRIPTION OF THE INVENTION

First Embodiment

Figure 1:
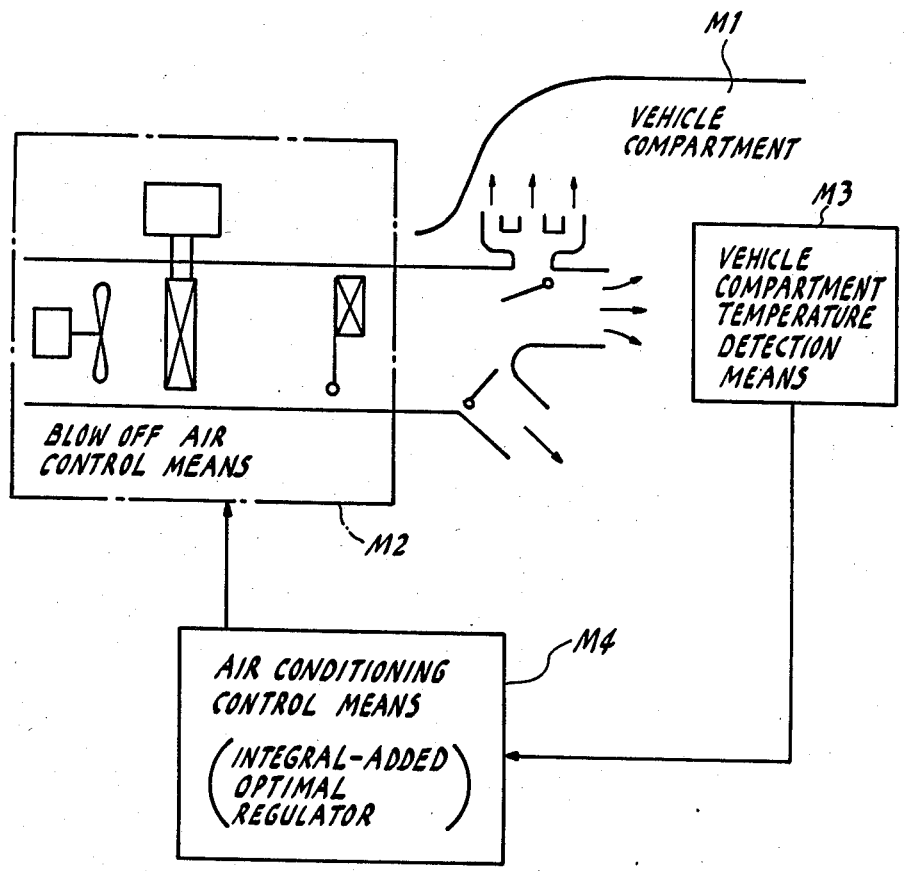
FIG. 1 is a basic structural diagram of the present invention.

Referring now to FIG. 1, a schematic diagram showing the general structure of the air conditioner as a first embodiment of the present invention is illustrated. The basic structure shown in the FIG. 1 is also used in other embodiments which will be described hereinlater with a portion thereof being slightly modified. The air-conditioner generally comprises blow off air control means M2 which controls blow off air discharged into a vehicle compartment M1, i.e. a controlled object, a vehicle compartment temperature detecting means M3, and an air conditioning control means M4. In the above, the blow off air control means M2 substantially corresponds to the air conditioning unit, which has been described in the above-mentioned prior art, and comprises at least means for controlling temperature and flow rate of the blow off air. For instance, taking flow rate as one of variables of blow off air, the above-mentioned means corresponds to a blower motor or sirocco fan which controls the flow rate of air by way of rotational speed and/or throttle opening degree. Similarly, taking temperature as one of variables of blow off air, the above-mentioned means corresponds to an actuator which controls a capability of a cooler, such as an evaporator, or another actuator which controls an opening degree of an air-mixing damper or the calorific value supplied to a heater (heater core). As an actuator for controlling the capability of a cooler there are one type which varies the capability by changing capacity of a compressor and another type which controls the flow rate of cooling medium.

The air conditioning control means M4 is actualized embodied as an logic operation circuit using a microprocessor together with peripheral elements, such as ROM and RAM, and input/output circuit, and is arranged to control the blow off air control means M2 in accordance with the amount of feedback which is determined by an optimal feedback gain predetermined in accordance with (a) dynamic model(s) of the system where air conditioning is performed using a setting target temperature and the internal air temperature detected by the internal air temperature detecting means M3 in accordance with processing procedure stored in advance. Namely, the air conditioning control means M4 is formed as an integral-added optimal regulator which determines an optimal amount of feedback of the variables of blow off air contolled by the blow off air control means M2 so that the internal air temperature approaches the target temperature. The above-mentioned system where air conditioning is performed is also referred to as air conditioning system, and it is to be understood that this system includes both used air conditioner and vehicle compartment.

A method of constituting such integral-added optimal regulator is described in detail in documents, such as "Linear System Control Theory" written by Katsuhisa FURUTA published by Shokoda Japan in 1976. An outlook for the method of actual forming of such regulator will be given hereinbelow. In the following description, the references F, X, A, B, C, D, J, y, u, L, G, Q, R, P indicate vectors (matrix), a superscript $T$ such as $A^T$ indicating transposed matrix, a superscript $-1$ such as $A^{-1}$ indicating inverse matrix, a symbol $\char`\^$ such as $\hat{X}$ indicating an estimate, a symbol $\sim$ such as $\tilde{C}$ indicating an amount handled by another system, i.e. a state observer (which will be simply referred to as observer hereinafter) which amount is generated by way of transform or the like from the system which is a controlled object, a symbol * such as y* indicating a target value respectively.

It is known in modern control theory that in a control of a controlled object, i.e. the system relating to internal air temperature in this case, the dynamic behavior of the controlled object is described in a discrete-time system as:

$$X(k) = A \cdot X(k-1) + B \cdot u(k-1) \quad (1)$$

$$y(k-1) = C \cdot X(k-1) \quad (2)$$

The above Eq. (1) is called a state equation, and Eq. (2) is called an output equation, and a term X (k) indicates state variables which represent the internal state of the system, a term u(k) indicates vectors comprising variables of blow off air controlled by the blow off air control means M2, and a term y(k) indicates vectors comprising variables representing the output of the system. In the system of air conditioning handled by the present invention, since these output vectors y(k) include only the internal air temperature, this will be handled as a scalar y(k) hereinafter. The Eqs. (1) and (2) are both described in discrete-time system, and a subscript "k" indicates that the value is of the present time, while a subscript "k−1" indicates that the value is of an instant which is one sampling cycle before the present time.

The state variables X(k) indicating the internal state of the system where air conditioning, i.e. temperature control of the internal air in this case, is performed, represents information relating to the history of the system which is necessary and sufficient for predicting the influence in future in the control system. Therefore, the dynamic model of the system, namely how the temperature within the vehicle compartment (internal air temperture) where air conditioning is performed by the blow off air control means M2 behaves, will be clear, and if we can determine vectors A, B and C of Eqs. (1) and (2), then it is possible to optimally control the internal air temperature using the state variables X(k). In a servo system, while the system has to be expanded, this will be described hereinlater.

It is difficult to accurately theoretically obtain dynamic models of a complex objective such as air conditioning, and therefore, it is necessary to obtain the same through experiments. This is a method of constructing a model, which method is so called system identification. When an air conditioner for an automobile is operated under a given state, the model is constructed according to state equation (1) and output equation (2) with which linear approximation is satisfied around the given state. Therefore, even in the case that the dynamic model related to the operation thereof is nonlinear, a linear approximation can be performed by dividing into a plurality of normal operating states. Therefore it becomes possible to determine each dynamic model.

If the controlled object is of a sort that a physical model can be relatively easily constructed, then the model (i.e. vectors A, B, and C) of a dynamic system can be determined through system identification which can be made through a method such as frequency response method or spectrum analysis. However, in the case of a controlled object of a multivariable system, such as the system taken here where air conditioning is performed, it is difficult to make a physical model which is accurately approximated. Therefore and in such a case, the dynamic model is constructed through the least square method, instrumental variable method or on-line identification.

Once a dynamic model is determined, an amount of feedback is determined from the state variables X(x), the internal air temperature y(k) and its target temperature y* (k), so that controlled variables u(k) of flow off air are theoretically and optimally determined.

In an air conditioner for automobiles, the amount of influence of airflow rate by a blower motor on the internal air temperature, i.e. the amount of contribution of airflow rate to the internal air temperature. Also the amount of influence of the opening degree of the air-mixing damper on the internal air temperature may be used as variables which are directly related to the control of the internal air temperature. These are treated as the state variables X(k). However, most of such variables cannot be directly measured. Therefore, a state observer (observer) is formed within the air conditioning control means M4 so that it is possible to estimate the state variables X(k) of the system where air conditioning is performed using values of the internal air temperature and the blow off air. This is the observer according to modern control theory, and various types of observers and their designing methods are known. These are described in detail, for instance, in "Mechanical System Control" written by Katsuhisa Furuta, published from Ohm Co. Ltd. in 1984, and the observer may be designed as a minimal order observer or a finite time settling observer in correspondence with the fashion of an applied controlled object, i.e. the air conditioner for automobile in this case.

The air conditioning control means M4 controls the blow off air control means M2, in a system expanded using measured state variables or state variables X(k) estimated by the above-mentioned observer and an accumulated value obtained by accumulating the differences between a setting target temperature and an actual internal air temperature, by determining an optimal feedback amount from both thereof and also from a predetermined optimal feedback gain. The accumulated value is a value which is necessary since the setting target temperature varies due to the manipulation of an operator or the demand from an automobile air conditioner. In a control of a servo system, it is required generally to perform a control for cancelling steady-state error between the target value and an actual controlled variable, and this corresponds to the necessity of inclusion of $1/S^l$ (integration of $l^{th}$ order) in a transfer function. In the case that a state equation is made with the transfer function of the system being determined through system identification as described in the above, it is preferable to include such integrated amount in view of stability against noise. In the present invention, $l=1$, namely, an integration of the first order may be considered. Therefore, when the accumulated value is introduced into the above-mentioned state variable X(k) to expand the system so as to determine the feedback amount from these values and a predetermined optimal feedback gain F, the controlled variables of the controlled object, i.e. the variables of the blow off air controlled by the blow off air control means M2 are determined as an integral-added optimal regulator.

Nextly, it will be described in connection with optimal feedback gain. In an optimal regulator to which an integral element is added as described in the above, the way of finding a control input (the variables of the blow off air of the system where air conditioning is performed in this case) which minimizes a performance index J is made clear, while it is also known that the optimal feedback gain can be obtained from a solution of Riccati equation, A, B, C matrixes of the state equation (1) and the output eauation (2), and the weighted parameter used in performance index (see the above-mentioned book). In the above, the weighted parameter is initially arbitrarily given so as to change the weighted in the regulation, by the performance index J, of the behavior of the variables of the blow off air of the system where air conditioning is performed. It is possible to determine an optimal value through repetition of simulation by changing the weighted parameter by a given amount from the behavior of the blow off air variables which are obtained as the result of simulation performed by a large computer with an arbitrary weighted parameter being given. As a result, an optimal feedback gain F is also determined.

Therefore, the air conditioning control means M4 in the air conditioner for automobile according to the present invention is formed as an integral-added optimal regulator using a dynamic model of a system where air conditioning is performed which dynamic model is determined in advance through system identification, and the parameter of the observer therein and an optimal feedback gain F and so on are determined in advance through simulation.

While it has been described that the state variable X(k) is an amount indicating the internal state of the system where air conditioning is performed, this may be a variable which corresponds to actual physical amount, such as the rotational speed of the blower motor or opening degree of the air mixing damper and so on, and this may be designed as a vector which comprises variables converted as variables which directly influence the internal air temperature as described in the above.

The first embodiment air conditioner for an automobile according to the present invention with the above-described structure operates so as to feedback control the variables of the blow off air by way of the blow off air control means M2. This is done in a way such that an optimal feedback amount is obtained, and so that the internal air temperature equals a target temperature by the air conditioning control means M4 which is formed as an integral-added optimal regulator on the basis of a setting target temperature within a vehicle compartment and the internal air temperature detected by the internal air temperature detecting means M3. Therefore, the internal air temperature is not controlled by a simple feedback control using the difference between the internal air temperature and the target temperature or prediction control. Rather, the control is performed so that the internal air temperature approaches the target temperature by optimally controlling the state of the blow off air.

Figure 2:
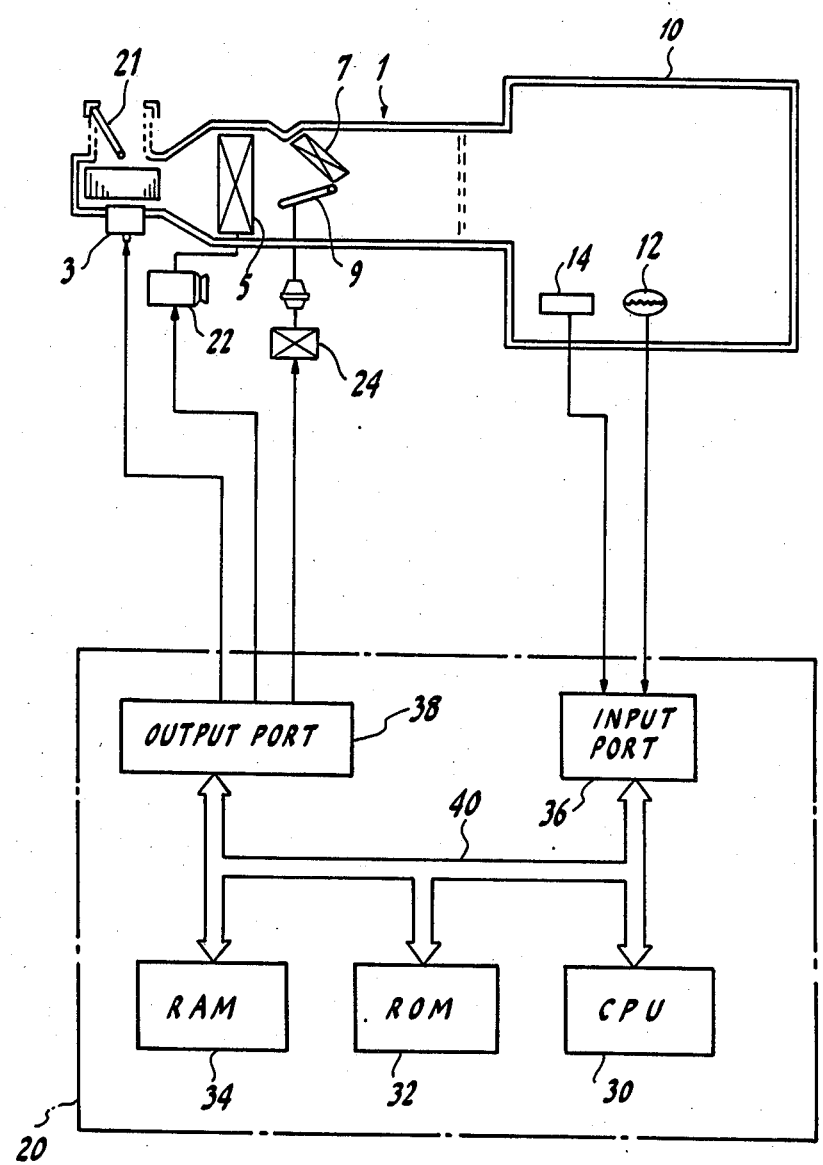
FIG. 2 is a schematic structural diagram of the air conditioner as a first embodiment of the present invention.
Figure 3:
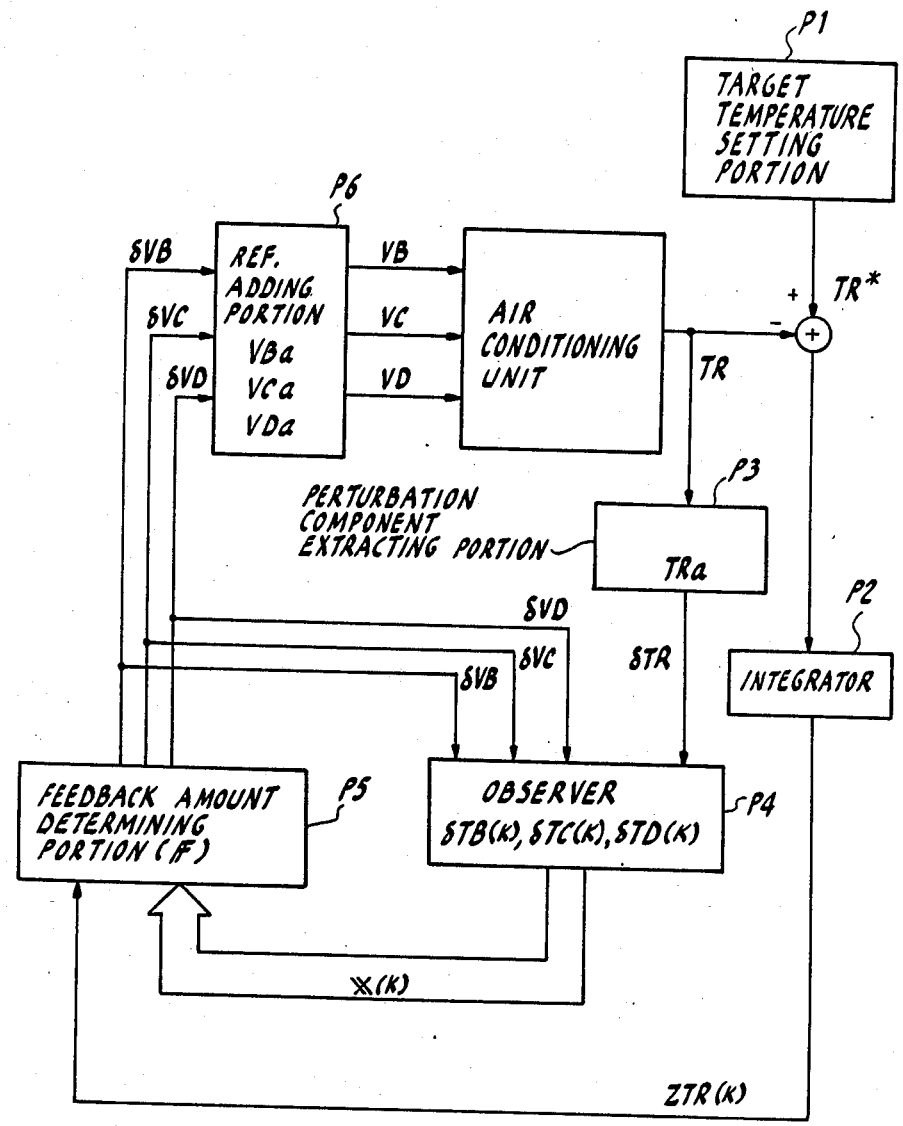
FIG. 3 is a control system diagram of a system where air conditioning is performed by the first embodiment.
Figure 4:
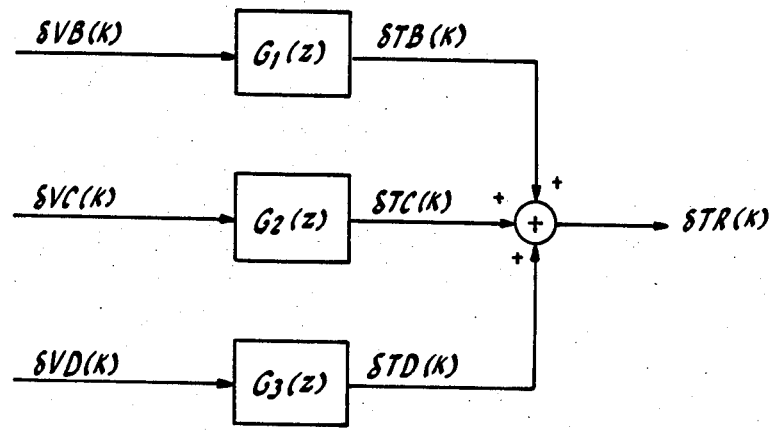
FIG. 4 is a block diagram used for indentifying models of the system of the first embodiment.
Figure 5:
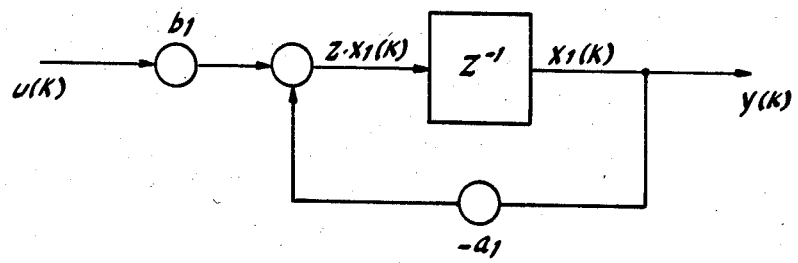
FIG. 5 is a signal flow diagram for obtaining transfer function in the first embodiment.
Figure 6:
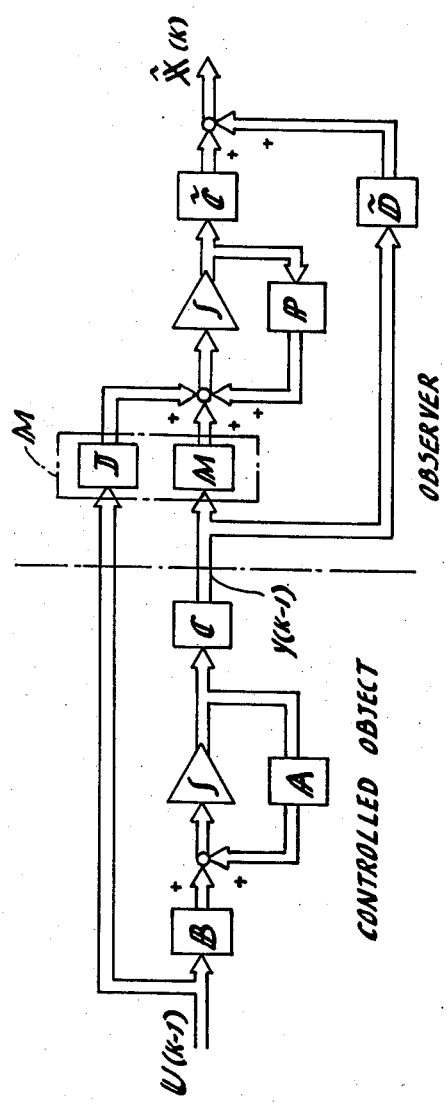
FIG. 6 is a block diagram showing the structure of a minimal order observer in the first embodiment.
Figure 7:
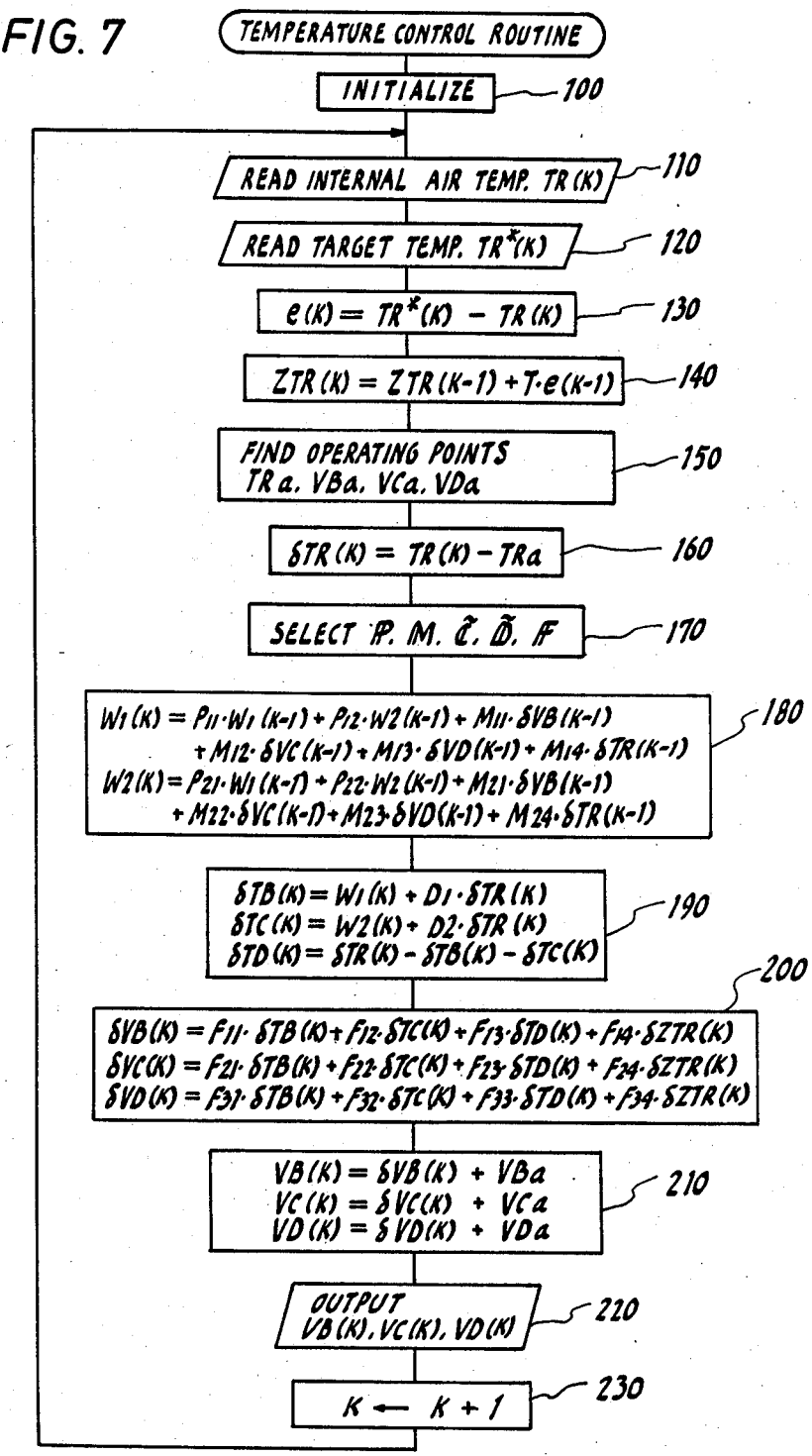
FIG. 7 is a flowchart showing the control as an integral-added optimal regulator in the first embodiment.

The first embodiment will be described with reference to other drawings in further detail. FIG. 2 is a schematic structural diagram showing an air conditioning apparatus for automobiles according to the first embodiment of the present invention, FIG. 3 is a control system diagram showing a control model of a system where air conditioning is performed, FIG. 4 is a block diagram for the description of system identification, FIG. 5 is a signal flow diagram thereof, FIG. 6 is a block diagram showing the structure of a minimal order observer, FIG. 7 is a flowchart showing one example of a control executed by an electronic control circuit, and the description will be given in this order.

In FIG. 2, the reference 1 is an air conditioning unit formed as air-mixing type centering a blower motor 3, an evaporator 5, a heater core 7, an air-mixing damper 9. The reference 10 indicates a passenger room equipped with an internal air temperature sensor 12 for detecting the internal air temperature TR and a temperature setter 14 and the reference 20 indicates an electronic control circuit which controls the air conditioning unit 1.

In the air conditioning unit 1, air sucked by the blower motor 3 via an internal/external air changeover damper 21 passes through the evaporator 5 to be cooled. Then, a portion thereof passes through the heater core 7 to be reheated and is then mixed with air which does not pass through the heater core 7 to be blown off into the passenger room 10. The ratio between air passing through the heater core and air not passing therethrough is controlled by the opening degree of the air-mixing damper 9. The evaporator 5 comprises a compressor 22 and conduits for circulating cooling medium, and is arranged to control the cooling capability by controlling the capability of the compressor 22 by the electronic control circuit 20. The control of the capability of the compressor 22, whose prime mover is an unshown vehicle-mounted engine, is performed by an actuator (not shown) which controls an opening area of a passage communicating between a high pressure chamber and a low pressure chamber of the compressor 22. The electronic control circuit 20 controls the cooling capability by controlling the driving voltage fed to the actuator, and this driving voltage of the built-in actuator is simply referred to as a drive signal or voltage of the compressor 22 hereinafter.

The heater core 7 is arranged so that coolant (hot water) of an unshown engine circulates, and when engine warming up is terminated, a given amount of calorific value is supplied to the heater core 7. Furthermore, the air-mixing damper 9 is arranged so that the damper opening degree is controlled by a damper actuator 24.

The electronic control circuit 20 is constructed as a logical operating circuit centering well known CPU 30, ROM 32, RAM 34 and so on with input port 36 and output port 38 being considered to each other by a common bus 40. The input port 36 receives an internal air temperature TR from the internal air temperature sensor 12 and a target temperature TR from a temperature setter 14 as electrical signals respectively corresponding thereto. The output port 38 outputs a drive signal VB for driving the blower motor 3, a drive signal VC of the compressor 22, a drive signal VD of the damper actuator and so on.

The electronic control circuit 20 feedback controls the blower motor 3, the compressor 22, the damper actuator 24 and so on according to a program prestored in the ROM 32 by drive signals (VB, VC, VD and so on) on the basis of signals (TR*, TR and so on) inputted from the temperature setter 14, the internal air temperature sensor 12 and so on. Now a control model used for the feedback control will be described. Especially, the way of obtaining the vectors A, B and C in the state equation (1) and output equation (2) used in connection with system identification, and the designing of the observer based thereon, and the way of obtaining the feedback gain F will be described along actual cases. FIG. 3 just shows the control system, and therefore, it does not shown hardware structure. The control system shown in FIG. 3 is actualized by executing a series of programs shown in a flowchart of FIG. 7 in practice, and is therefore actualized as a discrete-time system.

As shown in FIG. 3, the target temperature TR* is set by a target temperature setting portion P1. In this embodiment, the temperature setter 14 corresponds to the target temperature setting portion P1. An integrator P2 is used to obtain an accumulated value ZTR(k) by accumulating the differences between the target temperature TR* and the actual internal air temperature TR.

The reference P3 indicates a perturbation component extracting portion which extracts a perturbation component from the internal air temperature TRa under the state where steady air conditioning is being performed in connection with the internal air temperature TR. This is based on the fact that the dynamic model of the system is constructed by regarding the state of the air conditioning by the air conditioning apparatus as the continuance of regions where linear approximation is satisfied around a plurality of operating points in order to perform linear approximation for a nonlinear model. Therefore, the internal air temperature TR is handled as a perturbation component $\delta TR$ (=TR−TRa) relative to a predetermined nearest operating point. The operating condition of the air conditioning unit 1 obtained by the above-mentioned integrator P2, the observer P4 and the feedback amount determining portion P5, i.e. the drive voltage VB of the blower motor 3, the drive voltage VC of the compressor 22, and the drive voltage VD of the damper actuator 24 which determines the opening degree of the air-mixing damper 9, are also handled as perturbation components $\delta VB$, $\delta VC$, and $\delta VD$. These voltages VB, VC and VD determine the variables of the blow off air.

The observer P4 obtains state estimated variables X(k) by estimating state variables $\hat{X}(k)$ which represent the internal state of the air conditioning apparatus using the perturbation component $\delta TR$ of the internal air temperature and the perturbation components $\delta VB$, $\delta VC$, and $\delta VD$ of the above-mentioned operating conditions, and the state estimated variables X(k) and the above-mentioned accumulated value ZTR(k) are multiplied by the optimal feedback gain F in the feedback amount determining portion P5 so as to obtain the controlled variables ($\delta VB$, $\delta VC$, and $\delta VD$). Since the combination of the controlled variables ($\delta VB$, $\delta VC$, and $\delta VD$) are perturbation components relative to the operating condition corresponding to steady operating condition selected by the perturbation component extracting portion P3, the variables VB, VC and VD of the operating condition of the air conditioning apparatus are determined by adding reference setting values VBa, VCa and VDa corresponding to the steady operating condition to the perturbation components by a reference setting value adding portion P6.

While the structure of the control system has briefly been described, the reason that the drive voltage VB of the blower motor, the drive voltage VC of the compressor and the drive voltage VD of the damper actuator are taken as the operating conditions of the air conditioner is that these variables are basic values relating to the control of the internal air temperature TR in the air conditioner for automobile having an air conditioning unit 1 of air-mixing type. Therefore, in the first embodiment, the air conditioner can be visualized as a multivariable system of three inputs and one input. In the case that the air conditioner for the automobile is of the reheat type, a control model of another multivariable system may be formed such that a control of a water valve, which changes the flow rate of hot water circulating through a heater core, is used as one of the inputs.

Hereinabove, the hardware structure of the air conditioner for automobile and the structure of the control system have been described taking a system of three inputs and one output as an example which controls the output of the air conditioner. Now it will be described about the construction of a dynamic model througuh actual system identification, the designing of the observer P4, and how to give the optimal feedback gain F.

First of all, a dynamic model of an air conditioner for automobile is constructed. FIG. 4 is a diagram showing a system of an air conditioner under steady state operation as a system having three inputs and one output by way of transfer function G1(z) through G3(z). The reference z indicates z transformation of sampled values of the input/output signals, and it is assumed that G1(z) through G3(z) have an appropriate order. Therefore, the entire transfer function matrix G(z) is given by:

$$G(z) = [G1(z) \ G2(z) \ G3(z)]$$

When there exists an interference in the input/output variables, where the system is of three inputs and one output as in the air conditioner of this embodiment, it is extremely difficult to determine a physical model. In such a case, it is possible to obtain the transfer function through system identification.

The method of system identification is described in detail in "System Identification" written by Setsuo SAGARA published by Measurement and Automatic Control Society of Japan in 1981, and identification is performed here through least square method.

The air conditioner is put in steady state operation, and a variation of δVB of the drive voltage of the blower motor 3 is controlled by an appropriate test signal with both variations δVC and δVD of the drive voltages of the compressor 22 and the damper actuator being made zero. The input δVB, and data of a variation δTR of the internal air temperature as an output at this time are sampled N times. This is expressed as input data series of $\{u(i)\}=\{\delta VBi\}$ and as output data series of $\{y(i)\}=\{\delta TRi\}$ wherein i=1, 2, 3 . . . N. Here, the system can be regarded as having one input and one output, and thus the transfer function G1(z) is given by:

$$G1(z)=B(z^{-1})/A(z^{-1}) \quad (3)$$

Therefore, $$G1(z)=(b0+b1\cdot z^{-1}+\ldots +bn z^{-n})/(1+a1\cdot z^{-1}+a2\cdot z^{-2}+\ldots +an\cdot z^{-n}) \quad (4)$$

In the above, $z^{-1}$ is a unit shift operator indicating $z^{-1}\cdot x(k)=x(k-1)$.

When we determine parameters a1 to an and b0 to bn of Eq. (4) from the input and output data series $\{u(i)\}$ and $\{y(i)\}$, transfer function G1(z) can be obtained. These parameters are determined in system identification using least square method so that the following assumes a minimal value:

$$Jo = \sum_{k=n}^{N} [\{y(k) + a1 \cdot y(k-1) + \ldots + an \cdot y(k-n)\} - \{b0 \cdot u(k) + b1 \cdot u(k-1) + \ldots + bn \cdot u(k-n)\}]^2 \quad (5)$$

In this embodiment, respective parameters have been obtained assuming that n=1. In this case, a signal flow diagram of the system is as shown in FIG. 5, and using [X1(k)] as state variables, state and output equations thereof can be expressed by Eqs. (6) and (7):

$$X1(k-1) = z \cdot x1(k) \quad (6)$$
$$= -a1 \cdot x1(k) + b1 \cdot u(k)$$

$$y(k) = x1(k) \quad (7)$$

Therefore, using system parameters A1', B1', C1' for the parameters A, B, C in the case that the system is regarded as of one input and one output, we obtain:

$$A 1' = -a1 \quad (8)$$
$$B 1' = b1$$
$$C 1' = 1$$

Through similar method transfer functions G2(z), G3(z) as well as system parameters A2', A3', B2', B3', C2', C3' can be obtained. Therefore, using these system parameters, the system parameter of the original multivariable system of three inputs and one output, namely, vectors A, B, C of state equation (1) and output equation (2) can be determined.

In this way, the dynamic model of the present embodiment is obtained through system identification, and this dynamic model can be determined in the form that linear approximation is satisfied around a state where the air conditioner is operated under a given condition. Therefore, the transfer function G1(z) through G3(z) are respectively obtained through the above method in connection with a plurality of steady air conditioning states, and respective state equations (1) and output equations (2), i.e. vectors A, B, C, are obtained where the relationship between input and output thereof is satisfied between perturbation components δ.

Now, the way of designing the observer P4 will be described. While as the way of designing is known Gopinath' method, which is described in detail in "Basic System Theory" written by katsuhisa FURUTA and Akira SANO published from Corona Co. Ltd. in 1978, the observer is designed as a minimal order observer in this embodiment.

The observer P4 is used for estimating the internal state variable X(k) of the air conditioner from the perturbation component (δTR) of the internal air temperature which is air conditioned and from perturbation components (δVB, δVC, δVD) of the variables of the operating conditions, and the reason why the state estimated variables $\hat{X}(k)$ obtained by the observer P4 can be handled as actual state variable X(k) in the control of the system will be made clear hereinbelow. Let us assume that the output $\hat{X}(k)$ from the observer P4 is constructed as the following Eq. (9) on the basis of the state equation (1) and the output equation (2):

$$\hat{X}(k)=(A-L\cdot C)\cdot\hat{X}(k-1)+B\cdot u(k-1)+L\cdot y(k-1) \quad (9)$$

In Eq. (9), L is a matrix arbitrarily given. Modifyings Eqs. (1), (2) and (9), we obtain:

$$[X(k)-\hat{X}(k)]=(A-L\cdot C)[X(k-1)-\hat{X}(k-1)] \quad (10)$$

Therefore, if the matrix L is selected so that an eigenvalue of the matrix (A−L·C) is located within a unit circle, $\hat{X}(k)\rightarrow X(k)$ with k→∞, and thus it is possible to accurately estimate the internal state variable X (k) of the controlled object using series u(*), y(*), from the past, of the input control vector u(k) namely, the drive voltages [VB(k), VC(k), VD(k)] of the blower motor 3 and so on) and the output vector y(k) (namely, the internal air temperature TR(k) as a scalar y(k)).

FIG. 6 is a block diagram showing the structure of the minimal order observer. As the observer is formed in this way, and when estimating that the internal state variable of the observer is W(k), it will be understood that the state estimated variable $\hat{X}(k-1)$ is obtained as follows:

$$W(k)=P\cdot W(k-1)+M\cdot y(k-1)+J\cdot u(k-1) \quad (11)$$

$$X(k-1)=\bar{C}\cdot W(k-1)+\bar{D}\cdot y(k-1) \quad (12)$$

The vector J can be arbitrarily selected under a specific condition, and a speed of convergence as $\hat{X}(k)\rightarrow X(k)$ can be altered. Here, Eq. (11) is rewritten using a vector M which unites the vectors J and M as follows:

$$W(k) = P \cdot W(k-1) + M \cdot [y(k-1)u(k-1)]^T \quad (13)$$

As described in the above, a detailed way of designing of such a minimal order observer is known from the Gopinath' method of designing, and the following Eqs. are obtained in the present embodiment in connection with a given steady operating state of the air conditioner:

$$P = \begin{bmatrix} P11 & P12 \\ P21 & P22 \end{bmatrix} \quad (14)$$

$$M = \begin{bmatrix} M11 & M12 & M13 & M14 \\ M21 & M22 & M23 & M24 \end{bmatrix} \quad (15)$$

$$\tilde{C} = \begin{bmatrix} 1 & 0 \\ 0 & 1 \end{bmatrix} \quad (16)$$

$$\tilde{D} = \begin{bmatrix} D1 \\ D2 \end{bmatrix} \quad (17)$$

Here, δTB(k), δTC(k), δTD(k) are considered as the state estimated variable $\hat{X}(k)$ obtained by the observer, i.e. the variables indicating the internal state of the air conditioner. δTB(k) indicates a perturbation component of the actual temperature within vehicle compartment which temperature is affected by the drive voltage VB controlling the blow off airflow rate from the blower motor 3, δTC(k) indicating in a similar manner a perturbation component of the actual temperature within the vehicle compartment, which temperature is affected by the drive voltage VC of the compressor 22, and δTD(k) indicating in a similar manner perturbation a component of the actual temperature within the vehicle compartment, which temperature is affected by the damper actuator 24. Namely, the state estimated variable $\hat{X}(k)$ is given by:

$$\hat{X}(k) = [\delta TB(k)\delta TC(k)\delta TD(k)]^T \quad (18)$$

Now the way of obtaining the optimal feedback gain F will be described. Since the way of obtaining optimal feedback gain F is described in detail in the above-mentioned "Linear System Control Theory", only the results are shown here with the detail thereof being omitted.

Using $$\delta u(k) = u(k) - u(k-1)$$

$$\delta y(k) = y(k) - y(k-1)$$

around given operating points in connection with the control input $u(k) = [VB(k)VC(k)VD(k)]^T$ and an output $y(k) = TR(k)$ thereof, obtaining an optimal control input, i.e. operating condition u(k), which makes the following performance index J minimal, results in solving a control problem as an integral-added optimal regulator related to the control system of the air conditioner.

$$J = \sum_{k=0}^{\infty} [\delta y^T(k) \cdot Q \cdot \delta y(k) + \delta u^T(k) \cdot R \cdot \delta u(k)] \quad (19)$$

In the above, Q and R indicate weighted parameter matrixes, and k indicates the number of sampling times which is zero at the time of beginning of control, while the right side of Eq. (19) is an expression of so called quadratic form using diagonal matrixes of Q and R.

Here, the optimal feedback gain F is given as follows:

$$F = -(R + \bar{B}^T \cdot P \cdot \bar{B})^{-1} \cdot \bar{B}^T \cdot P \cdot \bar{A} \quad (20)$$

In Eq. (20), A and B are given by:

$$\bar{A} = \begin{bmatrix} 1 & -C \cdot A \\ 0 & A \end{bmatrix} \quad (21)$$

$$\bar{B} = \begin{bmatrix} -C \cdot B \\ B \end{bmatrix} \quad (21)$$

Furthermore, P is a solution of the following Riccati equation:

$$P = \bar{A}^T \cdot P \cdot \bar{A} - \bar{A}^T \cdot P \cdot \bar{B} \cdot (\bar{B}^T \cdot P \cdot \bar{B} + R)^{-1} \cdot \bar{B}^T \cdot P \cdot \bar{A} + \quad (23)$$

$$\begin{bmatrix} Q & 0 \\ 0 & 0 \end{bmatrix}$$

In the above, the performance index J in Eq. (19) has a meaning that it is intended to reduce the deviation from the control output y(k), i.e. the target temperature TR(k)* of the internal air temperature TR(k), with the variation of variables $u(k) = [VB(k)VC(k)VD(k)]^T$ as the control inputs to the air conditioner being regulated. The weighting of regulation of the variables u(k) of operating conditions can be altered by changing the values of the weighted parameter matrixes Q and R. Therefore, the state variables X(k) can be obtained as state estimated variables $\hat{X}(k)$ using Eqs. (12) and (13) if we obtain the optimal feedback gain F using Eq. (20) by obtaining P solving Eq. (23) with arbitrarily weighted parameter matrixes Q, R being selected using the dynamic model, i.e. matrixes A, B, C (which correspond to the above-mentioned $\bar{A}, \bar{B}, \bar{C}$) which is obtained in advance. Therefore, the control input u (k) to the air conditioner can be obtained as follows:

$$u(k) = F \cdot [\hat{X}(k)ZTR(k)]^T \quad (24)$$

By repeating simulation with the weighted parameter matrixes Q and R being altered until an optimal control characteristic is obtained, the optimal feedback gain F is obtained as:

$$F = \begin{bmatrix} F11 & F12 & F13 & F14 \\ F21 & F22 & F23 & F24 \\ F31 & F32 & F33 & F34 \end{bmatrix} \quad (25)$$

The construction of the dynamic models of the control system of the air conditioner has been described above through system identification using the least square method. However, when designing of the minimal order observer and during the computation of the optimal feedback gain F, these respective parameters P, M, $\bar{C}$, $\bar{D}$ as well as the optimal feedback gain F are obtained in advance so that actual control is performed within the electronic control unit 20 using only the results thereof.

Now, an actual control performed by the electronic control circuit 20 will be described with reference to a flowchart of FIG. 7. In the following description, an amount handled in a present processing is expressed by a subscript (k) and an amount handled in the latest cycle by another subscript (k−1).

After the air conditioner starts operating, the CPU 30 performs initializing processing, such as the clearing of the internal register of CPU 30, setting of initial controlled variables and so on, in step 100, and then repeats the execution of steps 110 through 230, which will be described hereinlater, in accordance with procedure prestored in the ROM 32 in advance. In this vehicle compartment temperature control routine, the above-mentioned values of $P, M, \bar{C}, \bar{D}, F$ which are prestored in the ROM 32, are used.

In the step 110, the output signal from the internal air temperature sensor 12 is inputted via the input port 36 to read vehicle compartment temperature, that is internal air temperature TR(k). In a step 120, an output signal from the temperature setter 14 is inputted in a similar manner to read the target temperature TR*(k).

In a subsequent step 130, a difference between the internal air temperature TR(k) read in step 110 and the target temperature TR*(k) read in step 120 is obtained as $e(k)=TR*(k)-TR(k)$, and then in a step 140, an accumulated value ZTR(k) of this difference e(k) from the past is obtained. More specifically, the accumulated value ZTR(k) is obtained using the following equation where T is sampling time period.

$$ZTR(k)=Z(k-1)+T \cdot e(k-1) \quad (26)$$

The above-mentioned steps 130 and 140 correspond to the integrator P2 shown in FIG. 3.

In a following step 150, a nearest state (which will be referred to as operating points TRa, VBa, VCa, VDa) among steady-state operating conditions of the air conditioner, which are taken as satisfying linear approximation when the dynamic model of the air conditioner is constructed from the internal air temperature TR(k) read in step 110, is obtained. In a step 160, a perturbation component δT relative to the operating points determined in step 150 is obtained in connection with the internal air temperature TR(k) read in step 110. It is assumed that values of the pertubation component, including δTR(k−1), of former cycle execution of this control routine is preserved. The processing by these steps 150 and 160 corresponds to the perturbation component extracting portion P3 of FIG. 3.

In a following step 170, parameters $P, M, \bar{C}, \bar{D}$ within the observer corresponding to the present operating condition of the air conditioner as well as the optimal feedback gain F and so on are selected.

Subsequent steps 180 and 190 are provided for computing the state estimated variables X(k), and [δTB(k) δTC(k) δTD(k)]$^T$ is obtained using Eq. (12) and (13). In detail in step 180, using a variable $W(k)=[W1(k) W2(k)]^T$, W1(k) and W2(k) are respectively given as:

$$W1(k)=P11 \cdot W1(k-1)+P12 \cdot W2(k-1)+M11 \cdot \delta VB(k-1)+M12 \cdot \delta VC(k-1)+M \cdot \delta VD(k-1)+M14 \cdot \delta TR(k-1)$$

$$W2(k)=P21 \cdot W1(k-1)+P22 \cdot W2(k-1)+M21 \cdot \delta VB(k-1)+M22 \cdot \delta VC(k-1)+M23 \cdot \delta VD(k-1)+M24 \cdot \delta TR(k-1)$$

Then in a following step 190, state estimated variables are obtained using the results of the step 180 as:

$$\delta TB(k)=W1(k)+D1 \cdot \delta TR(k)$$

$$\delta TC(k)=W2(k)+D2 \cdot \delta TR(k)$$

$$\delta TD(k)=\delta TR(k)-\delta TB(k)-\delta TC(k)$$

In the above, δVB(k−1), δVC(k−1), δVD(k−1), δTR(k−1) which are used in step 180 are of the values of the former cycle execution of this control routine as described in the above. Furthermore, the reason for obtaining δTD(k) which is one of the state estimated variables $\hat{X}(k)$, namely, the perturbation component δTD(k) of the temperature corresponding to the influence of the perturbation component δVD(k) of the drive voltage of the damper actuator 24 controlling the opening degree of the air-mixing damper TR(k) on the perturbation component TD(k) of the internal air temperature, as $\delta TR(k)-\delta TB(k)-\delta TC(k)$, is to simplify the computation so as to improve the processing speed, since the perturbation component δTR(k) of the internal air temperature has been already measured (step 160).

In a following step 200, the perturbation component VB(k) of the drive voltage of the blower motor 3, the perturbation component δVC(k) of the drive voltage of the compressor 22, and the perturbation component δVD(k) of the drive voltage of the damper actuator 24 are obtained from the state estimated variables $\hat{X}(k)=[\delta TB(k)\delta TC(k)\delta TD(k)]^T$ obtained in step 180, the accumulated value ZTR(k) obtained in step 140 using the optimal feedback gain F. Equations shown in step 200 of FIG. 7 are expressed in vector notation as follows:

$$[\delta VB(k)\delta VC(k)\delta VD(k)]^T = F \cdot [\delta TB(k)\delta TC(k)\delta TD(k) - ZTR(k)]^T$$

This processing corresponds to the feedback amount determining portion P5 of FIG. 3.

In a following step 210, actual drive voltages VB(k), VC(k), VD(k) are obtained by adding values VBa, VCa, VDa at operating points to the perturbation components δVB(k), δVC(k), δVD(k) of respective drive voltages obtained in step 200. This processing corresponds to the reference value adding portion P6 of FIG. 3.

In a following step 220, respective drive voltages VB(k), VC(k), VD(k) obtained in step 210 are outputted via the output port 38 to the blower motor 3, compressor 22 and the damper actuator 24. In a step 230, the value of subscript k indicating the number of times of sampling/operation/control is incremented by 1 to return to step 110 so as to repeat the processing of steps 110 through 230.

Figure 8:
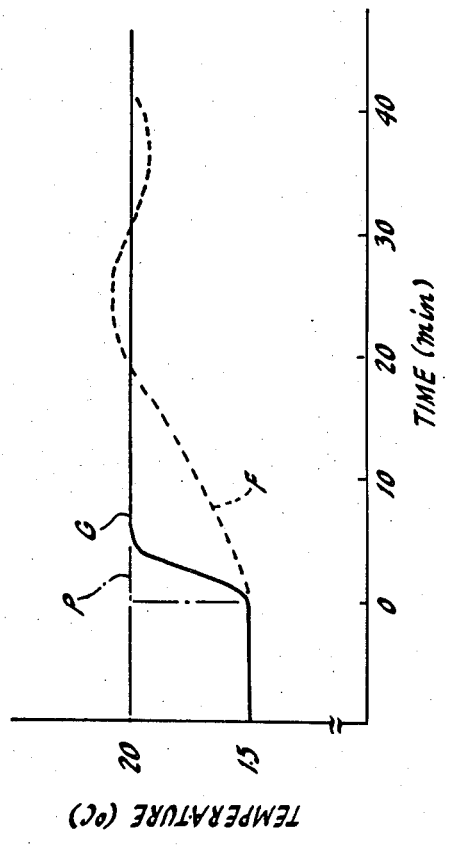
FIG. 8 is a graph for the comparison between the control characteristic of the first embodiment and an example of conventional control.

The example of the control according to the present control routine formed as described in the above, is shown in FIG. 8 in comparison with a conventional example of simple feedback control. As an example of control is taken a case where a target temperature is set to 20° C. by altering the internal air temperature, which is in thermal equilibrium at 15° C. as the result of air conditioning, by 5° C. This change in the target temperature is shown by a dot-dash line P in FIG. 8, and the change in the internal air temperature is plotted along a solid line G and a broken line F on the basis of an output signal from the internal air temperature sensor 12. The solid line G shows an example of control of the internal air temperature according to this embodiment, while the broken line F shows an example of control by the conventional control. As is apparent from FIG. 8 the first embodiment actualizes response characteristic which is quicker than that of conventional control, and is capable of adjusting the internal air temperature to a target temprature without suffering from overshooting or undershooting. Comparing durations required for the system to become stable, it will be understood that the first embodiment has improved by one or more degrees of magnitude, even though the rising is quick. Therefore, not only is it possible to control the temperature within a vehicle compartment to a target temperature with satisfactory response, but also the blower motor 3, compressor 22, damper actuator 24 are optimally controlled so as to prevent energy from being wasted. Furthermore, since the compressor 22 is not on-off controlled, it is possible to reduce tthe fluctuation of output torque of the internal combustion engine.

This is because the first embodiment is constructed such that control is performed using estimated information relating to the past history which is necessary and sufficient for predicting the state of the controlled object, that is the influence on the future, through experimental analysis of the controlled object, i.e system where air conditioning is to be performed, through system identification by constructing the control apparatus by way of the electronic control circuit 20 as an integral-added optimal regulator in place of simple feedback control based on predicted thermal equilibrium.

In the air conditioner for an automobile according to the first embodiment, the designing of the feedback gain in the electronic control circuit 20, which controls the internal air temperature, is carried out extremely logically to determine the same. Therefore, the process of setting the feedback gain through designing on the basis of experiences of a designer as in the designing of conventional control apparatus so as to perform actual adjustment if necessary is not required. Thereby, it is possible to reduce designing and development process and cost.

While one embodiment of the present invention has been described, the present invention is not limited to this embodiment, and thus the present invention may be practiced in various forms without departing from the spirit of the invention such that the present invention may be applied to an air conditioner of reheat type, other variable is used as the state variable X(k) and so on.

SECOND EMBODIMENT

Figure 9:
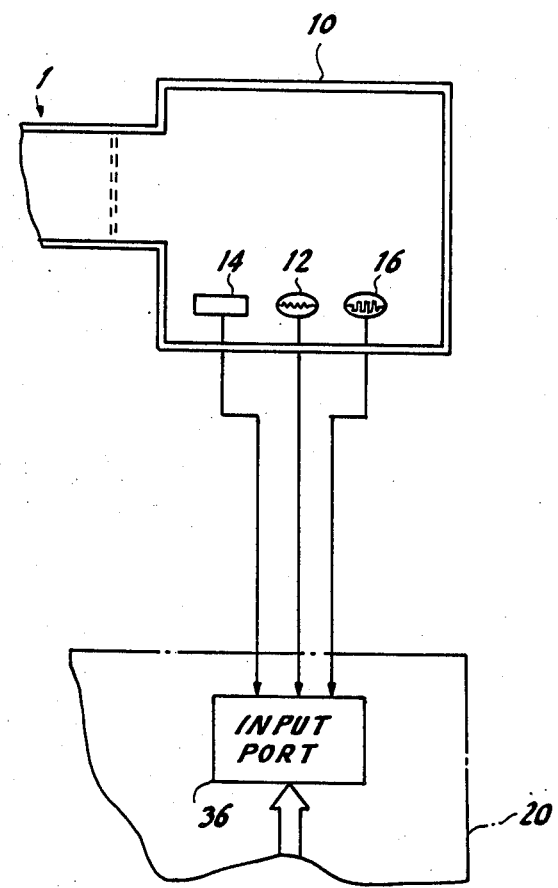
FIG. 9 is a schematic diagram showing partially a second embodiment of the present invention.

Reference is now made to FIG. 9 showing partially a second embodiment of the present invention. The second embodiment differs from the above-described first embodiment in that a solar radiation sensor 16 is provided. This solar radiation sensor 16 is positioned at an appropriate position within the vehicle compartment 10 to detect sun light incident on the vehicle compartment 10. In this way, the second embodiment comprises air conditioning environmental condition detecting means M5 which detects variables including solar radiation, as environmental condition(s) for air conditioning which varies the dynamic behavior of the system where air conditioning is performed. The change in the environmental condition detected by the air conditioning environmental condition detecting means M5 is used so as to alter internal variables including at least the optimal feedback gain of the above-mentioned integral-added optimal regulator in correspondence with the change in the dynamic models. Although FIG. 9 shows a solar radition sensor 16 as the air conditioning environmental condition detecting means M5, this is not limited to such parameter. For instance, the air conditioning environmental condition detecting means M5 may include other sensors for detecting, external temperature, humidity, vehicle speed, rotational speed of the intenal combustion engine, the efficiency of the heat exchanger and so on. The variables used as environmental conditions are causes for changing the dynamic behavior of the system where air conditioning is performed, and therefore, correspond to variables which cannot be controlled by the air conditioning control means M4, that is to say variables presented as disturbances to the system where feedback control is performed.

The air conditioning control means M4 is arranged so that the internal variables of the integral-added optimal regulator including at least the optimal feedback gain are changed in accordance with the variables of the environmental conditions of the air conditioning detected by the air conditioning environmental condition detecting means M5. As the internal variables of the integral-added optimal regulator there are parameters of the observer, and these parameters may assume various forms depending on the structure of the integral-added optimal regulator.

Turning to the construction of a dynamic model, which has been described in connection with the first embodiment, if the environmental condition(s), such as solar radiation, humidity and so on, of the system where air conditioning is performed are changed, the dynamic behavior of the system changes. Therefore, system identification for constructing the dynamic models has to be carried out separately with a plurality of ranges of given environmental conditions in which identity of the dynamic behavior of the system can be maintained, and therefore, dynamic model of the system, i.e. vectors A, B, C are determined for each of such ranges.

Figure 10:
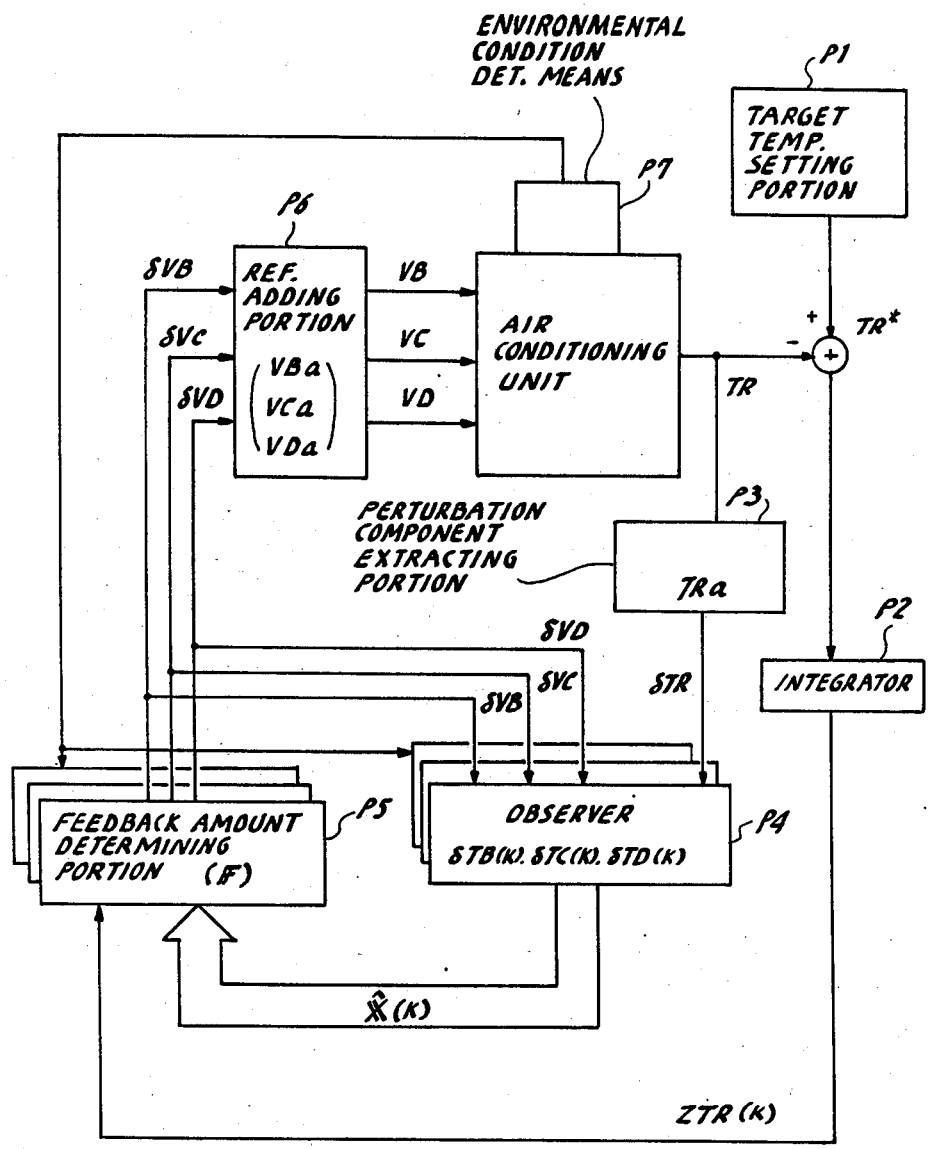
FIG. 10 shows the entire control system according to the second embodiment.

FIG. 10 shows the entire control system according to the second embodiment. The observer P4 used in the second embodiment is required to change the internal parameters thereof when the dynamic models (vectors A, B, C) is changed by the environmental conditions since the observer is used for estimating the state variables representing the internal state of the system where air conditioning is performed. Therefore, in the case that the air conditioning control means M4 is constructed as an integral-added optimal regulator having the observer P4, it is required to change the above-mentioned parameters in accordance with the environmental condition variables detected by the air conditioning environmental condition detecting means M5 corresponding to P7 in FIG. 10.

While it has already been described in connection with the first embodiment that it is desired to include integration amount in view of anti-noise stability, the inclusion of such integration amount is also desirable in the second embodiment since it is possible to absorb the disorder in control due to error occurring as the result of changing the internal variables of the integral-added optimal regulator.

Since the optimal feedback gain F assumes different values dependng on the dynamic model (vectors A, B, C) of the system, the optimal feedback gain values F are predetermined for each of given ranges of the environmental conditions so that one optimal feedback gain F is selected in accordance with variables detected by the air conditioning environmental condition detecting means M5.

Turning back to FIG. 9, the solar radiation sensor 16 provided within the vehicle compartment 10 is arranged to detect the amount of solar radiation Q and to produce an ouptut signal indicative of the same, which output signal is fed via the input port 36 to the CPU 30 and RAM 34. In FIG. 10, the observer P4 is shown to prestore a plurality of sets of parameters so that internal parameters thereof can be changed in accordance with detected amount of solar radiation. The air conditioning environmental condition detecting means P7 corresponds to the above-mentioned solar radiation sensor 16 of FIG. 9. While only solar radiation is handled in this embodiment as a variable changing the environmental conditions for air conditioning, it is possible to add some other variables, such as the humidity of the blow off air, the temperature of external air and so on which may be detected by appropriate sensors, so as to change parameters within the observer P4 and the optimal feedback gains in the feedback amount determining portion P5.

While it has already been described how the vectors A, B, C are obtained in connection with the first embodiment, system identification is performed as follows in the second embodiment. Since the transfer function G (z) of the system where air conditioning is performed changes as the solar radiation amount Q varies, the dynamic models of the system change accordingly. Therefore, system identification is performed in a plurality of ranges in each of which the identity of the dynamic models of the system is ensured. For instance, the ranges may be divided into four sections along the value of the detected solar radiation amount Q as (1) below 250 kcal/m$^2$h (2) between 250 kcal/m$^2$h and 750 kcal/m$^2$h (3) between 750 kcal/m$^2$h and 1250 kcal/m$^2$h (4) over 1250 kcal/m$^2$h. After system identification is made in each of the above four ranges, then the vectors A, B, C of the state equation (1) and the output equation (2) are respectively obtained for each of the ranges of solar radiation.

In the second embodiment, the vectors $P, M, \bar{C}, \bar{D}$ of Eqs. (14) through (17) are obtained in connection with a steady state operation of the air conditioner where the solar radiation amount Q is 1000 kcal/m$^2$h first, and then vectors $P, M, \bar{C}, \bar{D}$ are obtained respectively in connection with another steady state operations where the solar radiation Q is 0 kcal/m$^2$h, 500 kcal/m$^2$h, 1500 kcal/m$^2$h, and so on.

When obtaining the optimal feedback gain F of Eq. (25), several sorts of F are obtained depending on the ranges of solar radiation Q in the same manner as the vectors $P, M, \bar{C}, \bar{D}$.

Figure 11:
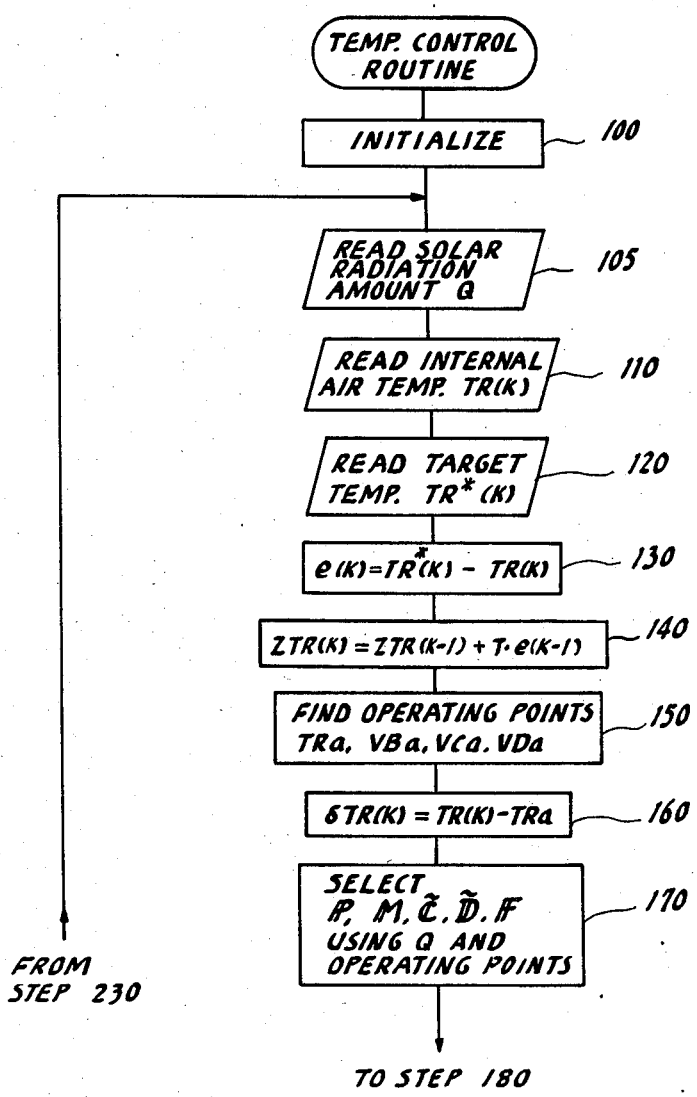
FIG. 11 shows partially a flowchart used for the second embodiment.

FIG. 11 shows partially a flowchart used for the second embodiment. This flowchart differs from the flowchart of FIG. 7 provided for the first embodiment in that a step 105 is newly provided and the contents of the step 170 are changed. The newly added step 105 is a step of reading the solar radiation amount Q. In detail, the output signal from the solar radiation sensor 16 of FIG. 9 is inputted via the input port 36 to the CPU 30 and the RAM 34. In the step 170, the parameters $P, M, \bar{C}, \bar{D}$ within the observer P4 as well as the optimal feedback gain F, which are suitable for the present operating condition of the air conditioner, are selected in accordance with the solar radiation value Q read in the step 105 and the operating points selected in the step 150. Remaining steps are the same as in the flowchart of FIG. 7, and thus the identical steps are omitted for simplicity.

Figure 12:
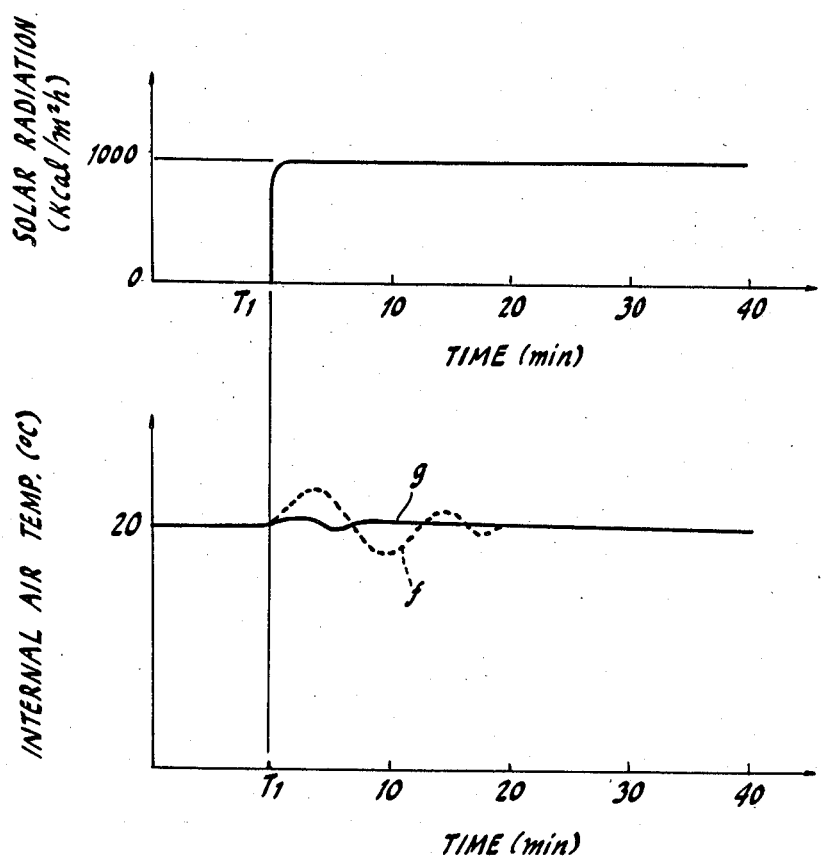
FIG. 12 is a graph showing the variation in the temperature of air in the vehicle compartment when solar radiation amount has suddenly increased.

The control characteristic of the second embodiment will be described assuming that the solar radiation amount Q has changed. FIG. 12 is a graph showing the variation in the temperature of air in the vehicle compartment when solar radiation amount Q has suddenly increased from 0 kcal/m$^2$h to 1000 kcal/m$^2$h at time t1. In FIG. 12 a solid curve "g" indicates a control characteristic of the second embodiment air conditioner, while a dotted curve "f" shows the same according to conventional control. In the second embodiment, since the dynamic models are immediately changed in response to the increase in solar radiation amount Q, it can be seen that the internal air temperature hardly changes. On the contrary, according to the conventional control overshooting and undershooting are repeated several times until the thermal equilibrium, which has been imbalanced due to the sudden change in solar radiation amount Q, is reached.

Figure 13A:
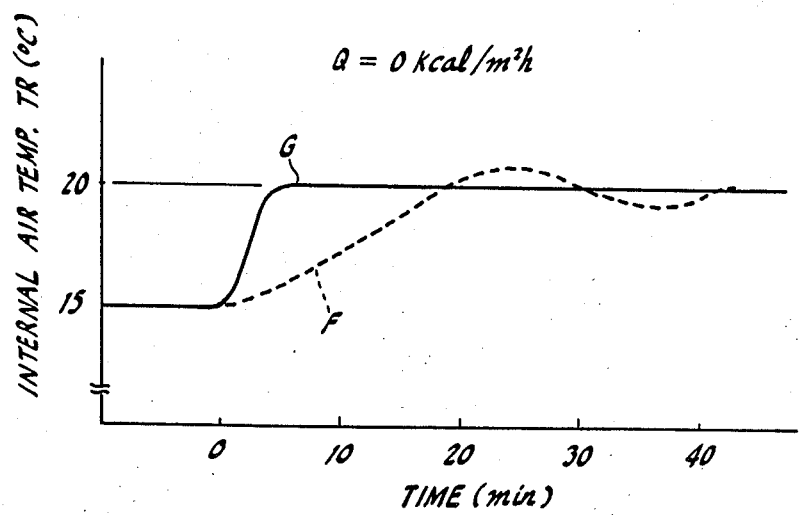
FIGS. 13A and 13B are graphs showing the state of variation of the intenal air temperature when the setting target temperature has been changed.
Figure 13B:
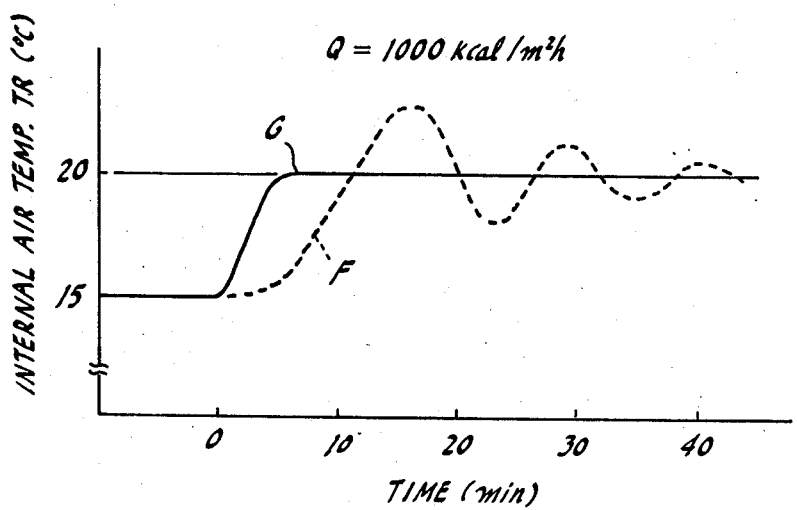

FIGS. 13A and 13B are graphs showing the state of variation of the intenal air temperature TR when the setting target temperature has been changed from 15° C. to 20° C. in two cases of solar radiation amount of 0 kcal/m$^2$h and of 1000 kcal/m$^2$h. In these graphs, solid curves "G" indicate a control characteristic of the second embodiment air conditioner, while dotted curves "F" shows the same according to conventional control in the same manner as in FIGS. 13A and 13B. In the conventional control, time lag in the response is remarkable in the case of solar radiation amount Q of 0 kcal/m$^2$h, and hunting is remarkable in the case of solar radiation amount of 1000 kcal/m$^2$h. In contrast with such undesirable characteristic, since the dynamic models are changed in the second embodiment, control can be achieved with superior response and high stability.

THIRD EMBODIMENT

A third embodiment, which is a modification of the above-described second embodiment, will be described. The third embodiment also comprises an air conditioning condition detecting means M5 which detects at least solar radiation amount as an environmental condition. In addition, the air conditioning control means M4 comprises a state variable detecting means M6 which determines a variable indicative of the internal state of the system where air conditioning is performed by detecting or estimating the same. The integral-added optimal regulator in the third embodiment is costructed such that a controlled variable of the blow off air control means M2 is determined using the internal state variable determined through detection or estimation, and the detected environmental condition of the system where air conditioning is performed, using predetermined feedback gain and feedforward gain of the dynamic model of the air conditioning system.

The state variable detecting means M6 is provided for either detecting or estimating the state variable indicative of the internal state of the air conditioning system, and may be constructed of a sensor which detects a state variable which can be readily detected. On the other hand, when a state variable is difficult to be detected by way of normal method, the state variable may be estimated by way of the observer. In the latter case, the state variable is estimated from variables of the blow off air, the internal air temperature, environmental condition and so on using parameters predetermined on the basis of the dynamic model of the system, and the observer may be integrally formed with the air conditioning control means M4.

The air conditioning control means M4 is arranged to determine the controlled variable of the blow off air control means M2 so that the controlled variable is determined by a feedback amount, which is determined by the state variable either detected or estimated by the state variable detecting means M6 and by the dynamic model of the air conditioning system, by environmental conditions detected by the environmental condition detecting means M5, and by a predetermined feedforward gain. As a result, the air conditioning control means M4 is contsturcted as an integral-added optimal regulator which controls so that the internal air temperature approaches the target temperature and when the environmental condition changes, feedforward control is also performed so as to determine optimal controlled variable of the blow off air controlled by the blow off air control means M2.

Now the structure of the integral-added optimal regulator which also performs feedforward control will be described. In the following description, references E, H, M, N, u, d are used to represent vectors (matrixes).

In the third embodiment, Eq. (1) described in connection with the first embodiment will be replaced with the following Eq. (1)'.

$$X(k) = A \cdot X(k-1) + B \cdot u(k-1) + E \cdot d(k-1) \quad (1)'$$

When performing feedforward control, the vector u(k) is determined by:

$$u(k) = F \cdot X(k) + H \cdot d(k) \quad (27)$$

In the above, d(k) is a vector indicating an uncontrollable input, i.e. disturbance, such as a variable of air conditioning environmental condition including solar radiation amount. The first term in the right side of Eq. (27) represents controlled variable of the blow off air controlled by feedback control, while the second term of the same represents controlled variable by feedforward control. Therefore, a feedback gain F and a feeforward gain H are optimally determined in advance, and when the state variable X(k) and disturbance d(k) are known, then the controlled variable u (k) of the blow off air can be optimally determined because the state variable X(k) represents information relating to the history of the air conditioning system necessary and sufficient for estimating future influence.

In the third embodiment, the dynamic model is represented by vectors A, B, C, E. Now the controlled variable corresponding to feedforward control will be described. In the third embodiment performing feedforward control, the controlled variable u(k) is obtained by Eq. (27) in connection with the state equation (1)' and the output equation (2). Therefore, if the feedforward gain H in Eq. (27) is optimally determined, the controlled variable u(k) can also be obtained optimally. As a method of determining feedforward gain H is known a method by Davison and Ando, and an optimal feedforward gain H, which determines an optimal feedforward amount with respect to step response, is determined using an optimal feedback gain F already obtained through aforementioned method. Actual solution will be described hereinlater. In the third embodiment, not only the feedback gain F but also the feedforward gain H are predetermined for respective ranges of air conditioning condition through simulation. The optimal controlled variable of the blow off air control means M2 is determined from the feedback gain F, the feedforward gain H, the state variables and the variables of the environmental condition of the airconditioning system or disturbance. Therefore, optimal control can be achieved through feedforward control even if the optimal condition, such as solar radiation amount, humidity and so on, changes.

Figure 14:
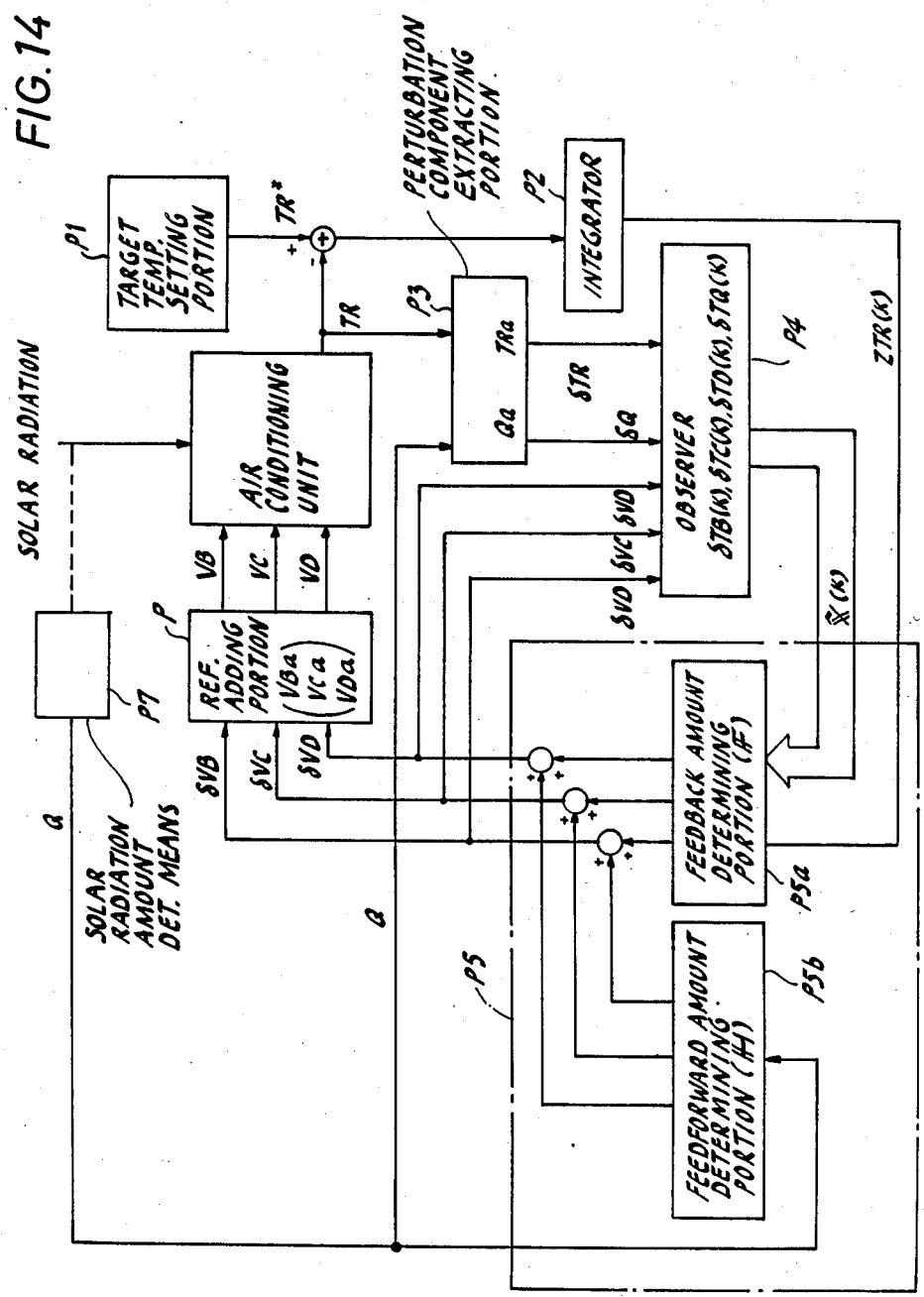
FIG. 14 shows the entire control system according to a third embodiment of the present invention.

FIG. 14 shows the above-mentioned third embodiment air conditioner. The structure of the third embodiment differs from that of the second embodiment in that a feedforward amount determining portion P5b is newly provided and the output signal from the solar radiation amount sensor 16 (air conditioning environmental condition detecting means P7) is applied to the feedforward amount determining portion P5b and to the perturbation component extracting portion P3. More specifically, in order to handle the solar radiation amount Q detected by the solar radiation amount sensor 16 as a perturbation component, the perturbation component $\delta Q (=Q-Qa)$ is extracted. In the third embodiment, the state variable X (k) is determined using the solar radiation amount Q detected by the solar radiation amount sensor 16 as $\hat{X}(k) = [\delta TB(k) \delta TC(k) \delta TD(k) \delta TQ(k)]^T$ The aforementioned feedback amount determining portion P5a and the feedforward amount determining portion P5b constitute a controlled variable determining portion P5 which outputs the sum of two variables as controlled variables ($\delta$VB, $\delta$VC, $\delta$VD) where one variable is obained with the state estimated variable X (k) estimated by the observer P4 and the accumulated value ZTR(k) being multiplied by the optimal feedback gain F, the other variable is obtained with the solar radiation amount Q being multiplied by the feedforward gain H. In this way controlled variables $\delta$VB, $\delta$VC, $\delta$VD are obtained.

Figure 15:
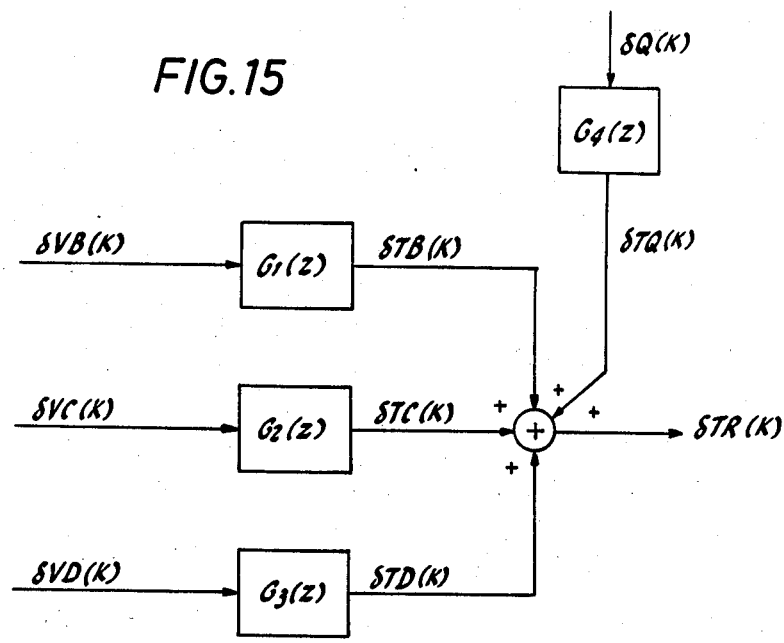
FIG. 15 is a block diagram used for identifying models of the system of the third embodiment.

It will be described how the feedforward gain H is obtained. As shown in FIG. 15, the entire transfer function matrix G(z) is expressed as:

$$G(z) = [G1(z) G2(z) G3(z) G4(z)]$$

On system identification, the perturbation component Q of the solar radiation amount Q is also made zero. In the third embodiment, system parameters A2', A3', A4', B2', B3', B4', C2', C3', C4' are obtained for each of the transfer functions G2(z) through G4(z). Eq. (9) described in connection with the first embodiment is modified in the third embodiment as the following Eq (9)':

$$\hat{X}(k) = (A - L \cdot C) \cdot X(k-1) + \quad (9)'$$
$$B \cdot u(k-1) + E \cdot d(k-1) + L \cdot y(k-1)$$

In the third embodiment, the internal state variables $\hat{X}(k)$ can be accurately estimated using also disturbance input d(k) and solar ratiation amount Q(k).

Figure 16:
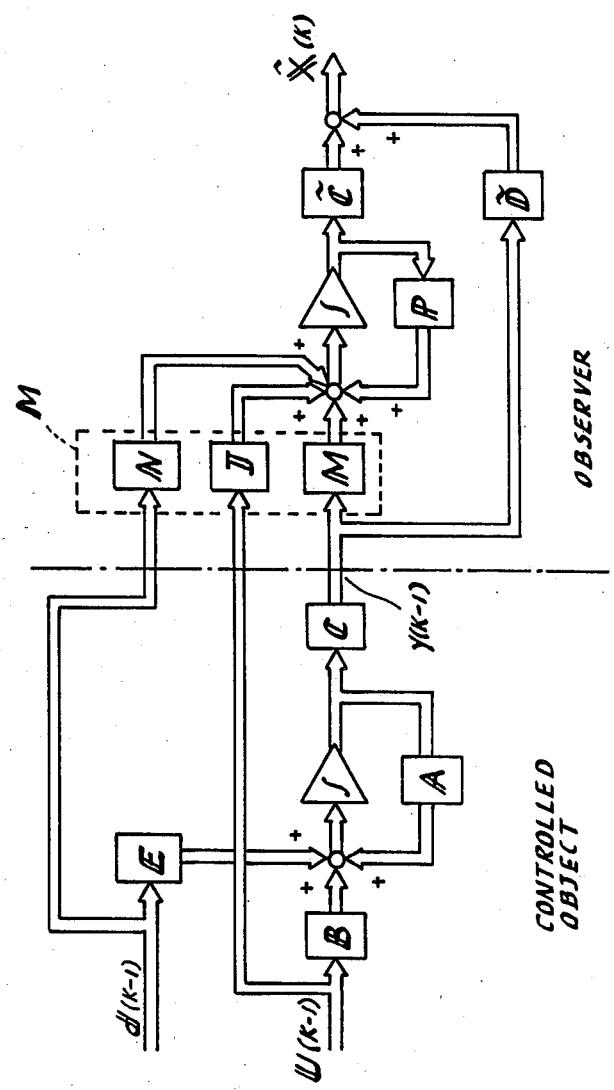
FIG. 16 is a block diagram showing the structure of a minimal order observer in the third embodiment.

FIG. 16 shows the structure of the minimal order observer used in the third embodiment. The internal state varaible W(k) of the observer is given by:

$$W(k) = P \cdot W(k-1) + M \cdot y(k-1) + \\ J \cdot u(k-1) + N \cdot Q(k-1) \quad (11)'$$

The vector J can be arbitrarily selected under a specific condition, and a speed of convergence as $\hat{X}(k) \rightarrow X(k)$ can be altered. Here, Eq. (11)' is rewritten using a vector M which unites the vectors J, N and M as follows:

$$W(k) = P \cdot W(k-1) + M \cdot [y(k-1)u(k-1)Q(k-1)]^T \quad (13)'$$

As described in the above, a detailed way of designing of such a minimal order observer is known from the Gopinath' method of designing, and the following Eqs. are obtained in the third embodiment in connection with a given steady operating state of the air conditioner:

$$P = \begin{bmatrix} P11 & P12 & P13 \\ P21 & P22 & P23 \\ P31 & P32 & P33 \end{bmatrix} \quad (14)'$$

$$M = \begin{bmatrix} M11 & M12 & M13 & M14 & M25 \\ M21 & M22 & M23 & M24 & M25 \\ M31 & M32 & M33 & M34 & M35 \end{bmatrix} \quad (15)'$$

$$\tilde{C} = \begin{bmatrix} 1 & 0 & 0 \\ 0 & 1 & 0 \\ 0 & 0 & 1 \end{bmatrix} \quad (16)'$$

$$\tilde{D} = \begin{bmatrix} D1 \\ D2 \\ D3 \end{bmatrix} \quad (17)'$$

Here, $\delta TB(k)$, $\delta TC(k)$, $\delta TD(k)$, $\delta TQ(k)$ are considered as the state estimated variable $\hat{X}(k)$ obtained by the observer, i.e. the variables indicating the internal state of the air conditioner. $\delta TB(k)$ indicates perturbation component of the actual temperature within vehicle compartment which temperature is affected by the drive voltage VB controlling the blow off airflow rate from the blower motor 3, $\delta TC(k)$ indicating in a similar manner perturbation component of the actual temperature within vehicle compartment which temperature is affected by the drive voltage VC of the compressor 22, $\delta TD(k)$ indicating in a similar manner perturbation component of the actual temperature within vehicle compartment which temperature is affected by the damper actuator 24, and $\delta TQ(k)$ indicating perturbation component of the actual internal air component affected by the variation in solar radiation amount Q. Namely, the state estimated variable $\hat{X}(k)$ is given by:

$$\hat{X}(k) = [\delta TB(k) \delta TC(k) \delta TD(k) \delta TQ(k)]^T \quad (18)'$$

A portion of the control input u(k) to the air conditioner, which corresponds to the feedback amount $F \cdot [\hat{X}(k) \, ZTR(k)]^T$ can be obtained.

By repeating simulation with the weighted parameter matrixes Q and R being altered until an optimal control characteristic is obtained, the optimal feedback gain F is obtained as:

$$F = \begin{bmatrix} F11 & F12 & F13 & F14 & F15 \\ F21 & F22 & F23 & F24 & F25 \\ F31 & F32 & F33 & F34 & F35 \end{bmatrix} \quad (25)'$$

Now, the way of obtaining the feedforward gain H will be described. The minimal value of the performance index J in the case of performing optimal regulator control is given by:

$$\min J = X(0)^T \cdot P \cdot X(0) \quad (28)$$

Let us consider a case that stepwise disturbance, i.e sudden change in solar radiation amount, is given to the air conditioning system. At this time a final value of the state variable X(k) is expressed by $X(\infty)$. When shifting an equilibrium point, the problem of step response becomes equivalent to a problem whose initial value is $-X(\infty)$. At this time, the minmal value min J of the performance index is given by:

$$\min J = X(\infty)^T \cdot P \cdot X(\infty) \quad (29)$$

Since it is known that the value of $X(\infty)$ depends on the feedforward gain H, the value of the feedforward gain H can be obtained so that the value of Eq. (29) is minimal. In the equations (1)', (2) and (27), modification is made with $X(0)=0$ and $X(k) \rightarrow X(\infty)$. From Eq. (29) and (27) we obtain:

$$A \cdot X(\infty) + B \{[F \cdot X(\infty) + H \cdot d\} + Ed = 0$$

Modifying the above equation, we obtain:

$$X(\infty) = (A + B \cdot F)^{-1} \cdot (B \cdot H + E) \cdot d \quad (30)$$

While the optimal feedback gain F has been obtained be Eq. (20) as described in connection with the first embodiment, since F has been determined using optimal regulator theory, the term $(A \cdot B + F)$ in Eq. (30) is of nonsingular. In addition, vector P is a positive definite matrix. Since respective columns of vector B are independent from each other, a feedforward gain H making Eq. (29) minimal can be obtained as follows. First of all, substituting Eq. (30) into Eq. (29), we obtain:

$$\min J = (\xi + \delta \cdot H)^T \cdot P \cdot (\xi + \delta \cdot H) \cdot d^2 \quad (31)$$

wherein the following definition is made:

$$\xi \triangleq (A + B \cdot F)^{-1} \cdot E$$

$$\delta \triangleq (A + B \cdot F)^{-1} \cdot B$$

Since the disturbance d involves only solar radiation amount Q which is a scalar value, the value obtained through below shown partial differential of Eq. (31) with respect to H equals zero.

$$\partial \min J / \partial H = 2(\Gamma^T \cdot P \cdot \xi + \Gamma^T \cdot P \cdot \Gamma \cdot H) Q^2$$

Therefore, the feedforward gain H can be determined as:

$$H = -(\Gamma^T \cdot P \cdot \Gamma)^{-1} \Gamma \cdot^T \cdot P \cdot \xi \quad (32)$$

As the feedback gain F as well as the vectors A, B, C are already determined, the feedforward gain $H = [H1 \, H2 \, H3]^T$ is readily obtained from Eq. (32).

In this way, the feedforward gain H is obtained, and various values thereof are obtained in advance in the same manner as the values of the feedback gain F to use the results thereof within the electronic control circuit 20.

Figure 17:
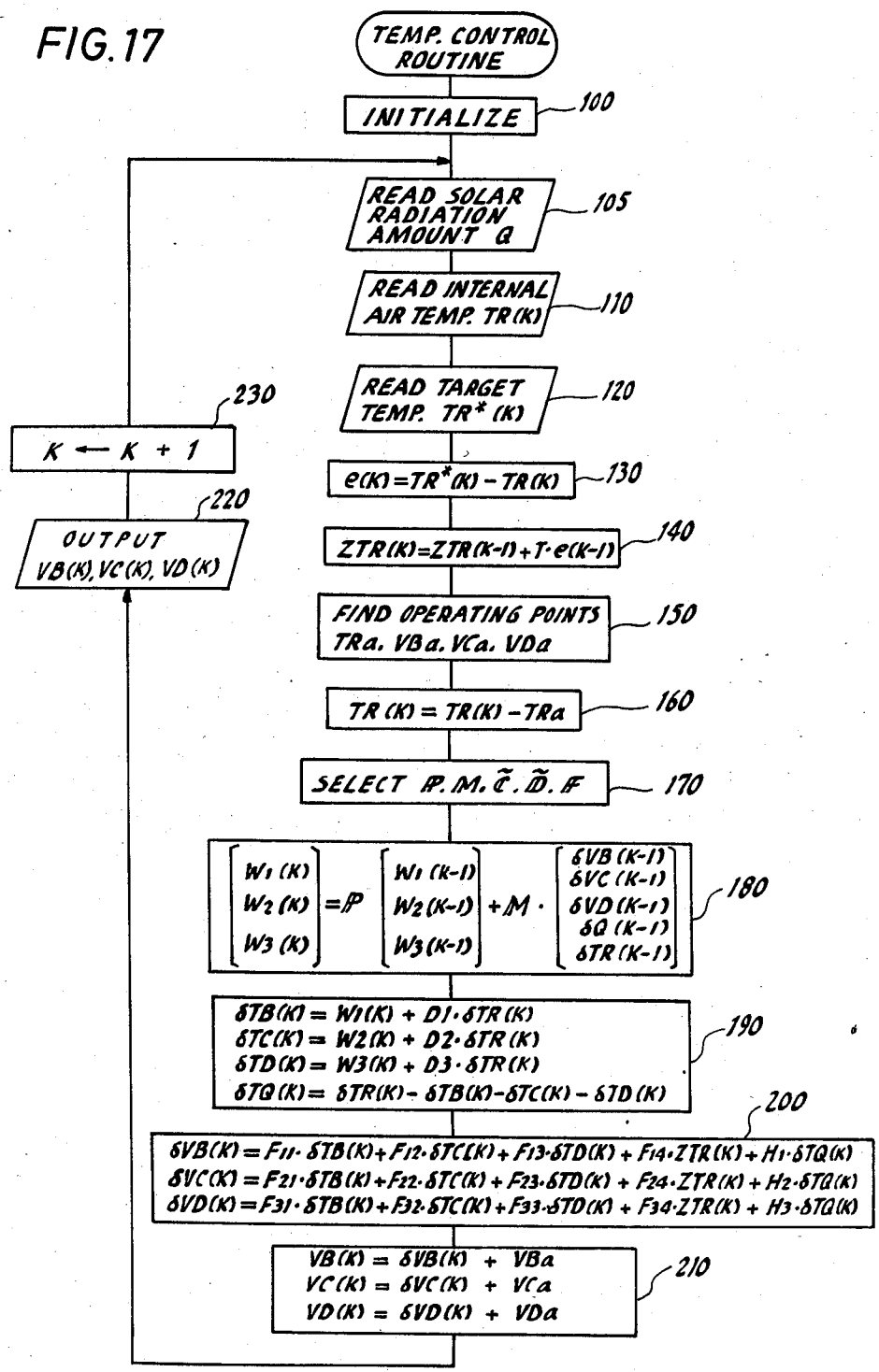
FIG. 17 shows a flowchart used for the third embodiment.

FIG. 17 shows a flowchart for the operation of the third embodiment. Values of the vectors P, M, $\tilde{C}$, $\tilde{D}$, F, H are prestored in the ROM 32.

The flowchart of FIG. 17 is similar to that of the aforementioned first and second embodiments, and therefore, only different parts from FIG. 11 will be described. In the third embodiment, since the solar radiation amount Q is treated as a perturbation component relative to zero solar radiation, then $\delta Q = Q$ in step 160. In a subsequent step 170, parameters $\mathbf{P}, \mathbf{M}, \bar{\mathbf{C}}, \bar{\mathbf{D}}$ within the observer suitable for the present operating state of the air conditioner as well as optimal feedback gain F and feedforward gain H are selected on the basis of the operating point selected in step 150.

Subsequent steps 180 and 190 are provided for computing the state estimated variables $\hat{\mathbf{X}}$ (k), and $[\delta TB(k)\ \delta TC(k)\ \delta TD(k)\ \delta TQ(k)]^T$ is obtained using Eqs. (12) and (13). In detail in step 180, using a variable $W(k) = [W1(k)\ W2(k)\ W(k)]^T$, W1(k), W2(k) and W3(k) are respectively given as:

$$W1(k) = P11 \cdot W1(k-1) + P12 \cdot W2(k-1) + P13 \cdot$$
$$W3(k-1) + M11 \cdot \delta VB(k-1) + M12 \cdot \delta VC(k-1) +$$
$$M13 \cdot \delta VD(k-1) + M14 \cdot \delta Q(k-1) + M15 \cdot \delta TR(k-1)$$

$$W2(k) = P21 \cdot W1(k-1) + P22 \cdot W2(k-1) + P23 \cdot$$
$$W3(k-1) + M21 \cdot \delta VB(k-1) + M22 \cdot \delta VC(k-1) +$$
$$M23 \cdot \delta VD(k-1) + M24 \cdot \delta Q(k-1) + M25 \cdot \delta TR(k-1)$$

$$W3(k) = P31 \cdot W1(k-1) + P32 \cdot W2(k-1) + P33 \cdot$$
$$W3(k-1) + M31 \cdot \delta VB(k-1) + M32 \cdot \delta VC(k-1) +$$
$$M33 \cdot \delta VD(k-1) + M34 \cdot \delta Q(k-1) + M35 \cdot \delta TR(k-1)$$

Then in a following step 190, state estimated variables are obtained using the results of the step 180 as:

$$\delta TB(k) = W1(k) + D1 \cdot \delta TR(k)$$
$$\delta TC(k) = W2(k) + D2 \cdot \delta TR(k)$$
$$\delta TD(k) = W3(k) + D3 \cdot \delta TR(k)$$
$$\delta TQ(k) = \delta TR(k) - \delta TB(k) - \delta TC(k) - \delta TD(k)$$

In the above, $\delta VB(k-1)$, $\delta VC(k-1)$, $\delta VD(k-1)$, $\delta TR(k-1)$, $\delta TQ(k-1)$ and so on which are used in step 180 are of the values of the former cycle execution of this control routine as described in the above. Furthermore, the reason for obtaining $\delta TQ(k)$ which is one of the state estimated varables $\hat{X}$ (k), namely, the perturbation component $\delta TQ(k)$ of the temperature corresponding to the influence of the variation in the solar radiation amount on the perturbation component $\delta TR(k)$ of the internal air temperature as $\delta TR(k) - \delta TB(k) - \delta TC(k) - \delta TD(k)$, is to simplify the computation so as to improve the processing speed since the perturbation component $\delta TR(k)$ of the internal air temperature is already measured (steps 110 and 160).

In a following step 200, the perturbation component $\delta VB(k)$ of the drive voltage of the blower motor 3, the perturbation component $\delta VC(k)$ of the drive voltage of the compressor 22, and the perturbation component $\delta VD(k)$ of the drive voltage of the damper actuator 24 are obtained from the state estimated variables $\hat{X}(k) = [\delta TB(k) \delta TC(k) \delta TD(k) \delta TQ(k)]^T$ obtained in step 180, the accumulated value ZTR(k) obtained in step 140 using the optimal feedback gain F and feedforward gain H. Equations shown in step 200 of FIG. 17 are expressed in vector form as follows:

$$[\delta VB(k)\delta VC(k)\delta VD(k)]^T = F \cdot [\delta TB(k)\delta TC(k)\delta TD(k)\delta TR(k)]^T + H \cdot \delta TQ(k)$$

This processing corresponds to the feedback amount determining portion P5 of FIG. 14.

Figure 18:
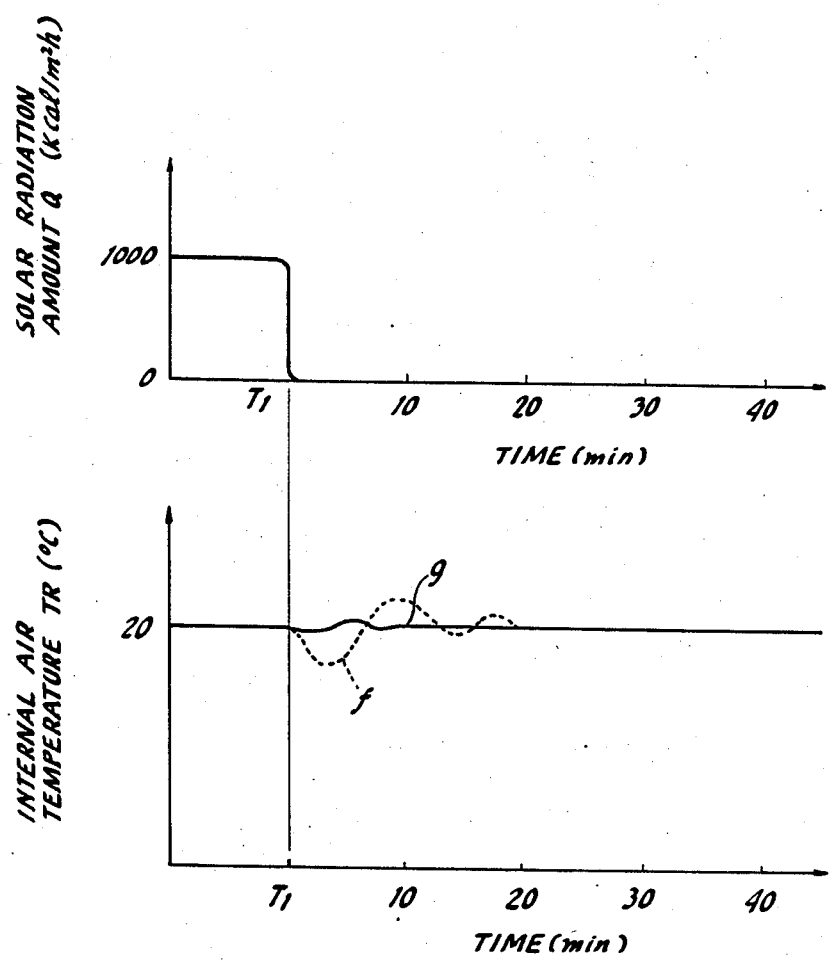
FIG. 18 is a graph showing the variation in the temperature of air in the vehicle compartment when solar radiation amount has suddenly decreased.

Now the control characteristic of the third embodiment will be described taking a case where solar radiation amount Q has changed. FIG. 18 is a graph showing the variation of the internal air temperature in the case that solar radiation amount Q has been suddenly reduced from 1000 kcal/m²h to 0 kcal/m²h at time T1. Actually, this corresponds to a case that a travelling motor vehicle receiving strong sun light enters a tunnel. In FIG. 18 a solid curve "g" indicated a control characteristic of the third embodiment air conditioner, while a dotted curve "f" shows the same according to conventional control. In the third embodiment, since the feedforward controlled variable immediately changes in response to the decrease in solar radiation amount Q, the control of the variables of the blow off air can quickly be effected, and therefore, it can be seen that the internal air temperature TR hardly changes. On the contrary, according to the conventional control overshooting and undershooting are repeated several times until the thermal equilibrium, which has been imbalanced due to the sudden change in solar radiation amount Q, is reached.

FOURTH EMBODIMENT

Figure 19:
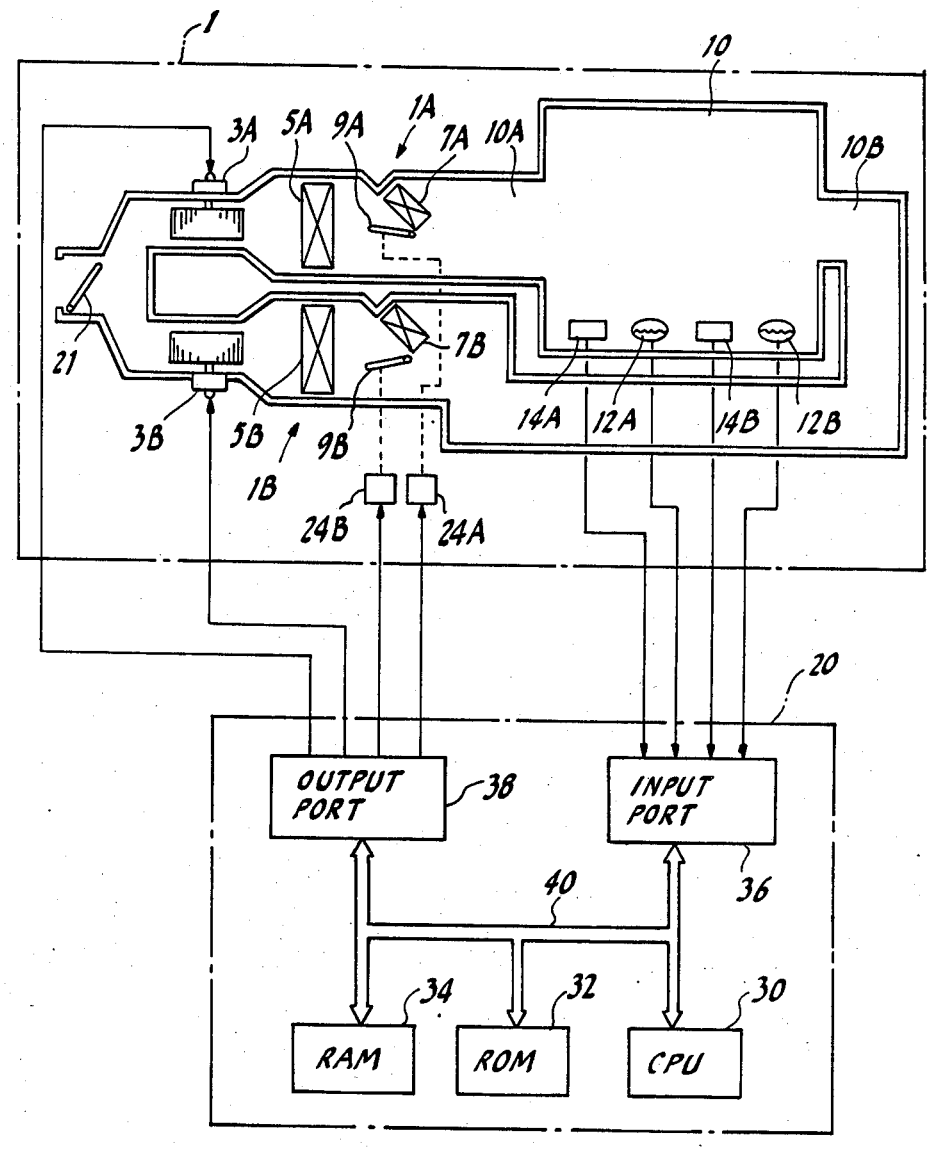
FIG. 19 is a schematic structural diagram of the air conditioner as a fourth embodiment of the present invention.

Reference is now made to FIG. 19 showing a fourth embodiment of the present invention arranged to control temperature at two different positions in a vehicle compartment. The reference 1 indicates a controlled object including air conditioning units, peripheral equipment, vehicle compartment and so on. Two independent air conditioning units 1A and 1B are provided for a front portion of the vehicle comparment 10 and for a rear portion of the same. The references 10A and 10B are air-discharge outlets of these two air conditioning units 1A and 1B. These two air conditioning units 1A and 1B correspond to the air conditioning control means M2, and comprise blower motors 3A and 3B for controlling blow off airflow rate, evaporators 5A and 5B, air-mixing dampers 9A and 9B, heater cores 7A and 7B, and actuators 24A and 24B for driving the air-mixing dampers 9A and 9B. Within the vehicle compartment 10, temperature setters 14A and 14B are provided for respectively setting desired temperatures for the front portion and the rear portion of the vehicle compartment, while temperature sensors 12A and 12B corresponding to the internal air temperature detecting means M3 are provided for respectively detecting the temperatures at the front and rear portions of the vehicle compartment.

The structure of the fourth embodiment is similar to that of the first embodiment except for the fact that two air conditioning units 1A and 1B are provided so as to control internal air temperatures at the front and rear portions of the vehicle compartment 10. Detected temperatures at the front and rear portions are expressed in terms of TR1 and TR2 respectively, while target temperatures therefor are expressed in terms of TR1 and TR2.

Figure 20:
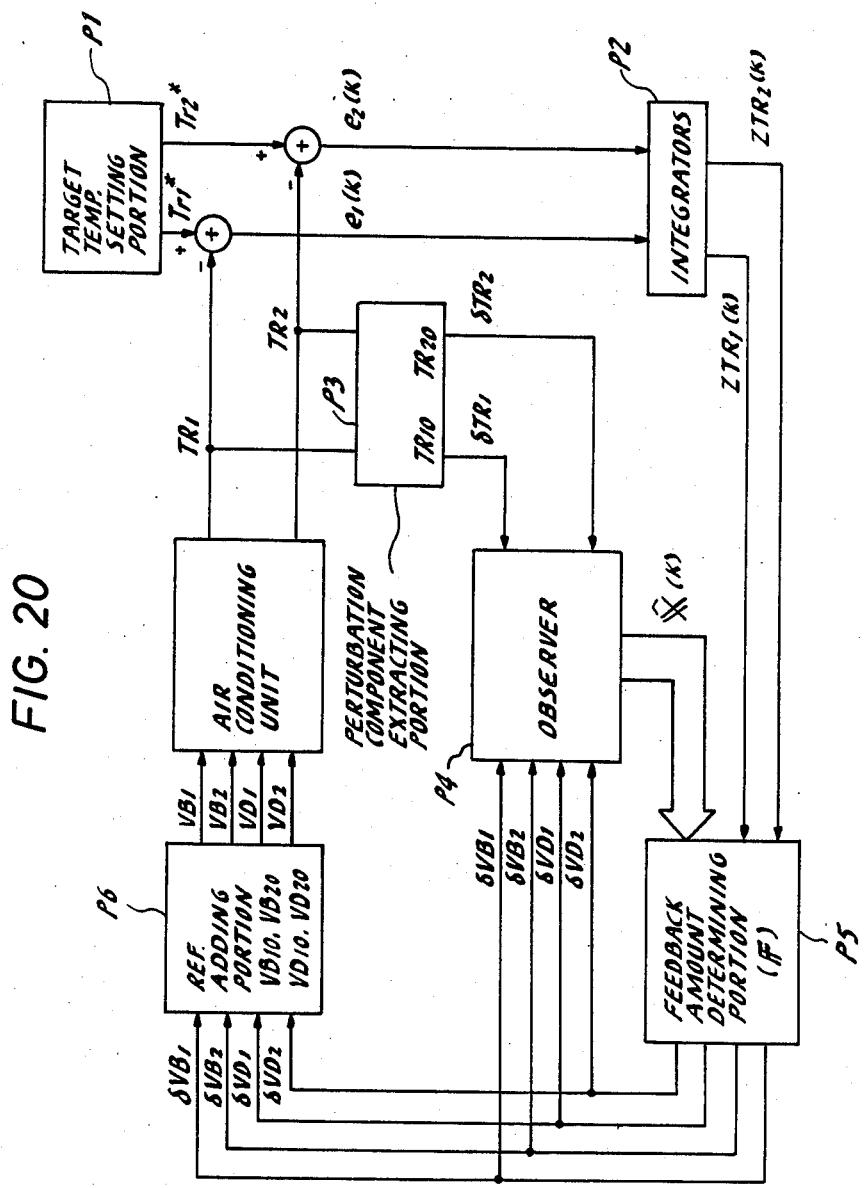
FIG. 20 shows the entire control system according to a fourth embodiment of the present invention.

The fourth embodiment will be described in detail with reference to FIG. 20 showing the schematic diagram of the electronic control circuit 20 used in this embodiment. FIG. 20 only shows the function of the electronic control circuit 20, and thus does not show hardware structure of the same, while the function of the electronic control circuit 20 is actually performed through the execution of a program shown by the flowchart of FIG. 23 as will be described hereinlater. As shown in FIG. 20, the target temperatures TR1 and TR2 are set by the target temperatur setting portion P1 including the temperature setters 14A and 14b of FIG. 19. The differences e1(k) and e2(k) between the target temperatures TR1* TR2* and actual internal air temperatures TR1 and TR2 are respectively accumulated by the integrators P2 to obtain accumulated values ZTR1(k) and ZTR2(k).

The perturbation component extracting portion P3 used in the fourth embodiment is arranged to extract perturbation components $\delta TR1$ and $\delta TR2$ relative to a state where steady air conditioning is performed, in connection with the internal air temperatures TR1 and TR2. In the fourth embodiment, the operating conditions of the respective air conditioning units 1A and 1B obtained by the above-mentioned integrator P2, the observer P4 and the feedback determining portion P5, i.e. the drive voltages VB1 and VB2 of the blower motors 3A and 3B, and drive voltages VD1 and VD2 of the actuators 24A and 24B determining the opening degree of the air-mixing dampers 9A and 9B, which determine the variables of the air discharged from the outlets 10A and 10B, are handled as perturbation components $\delta VB1$, $\delta VB2$, $\delta VD1$ and $\delta VD2$. In FIG. 20, $\delta TR1$ and $\delta TR2$ indicate perturbation components of internal air temperatures, while $\Delta VB1$, $\delta VB2$, $\delta VD1$ and $\delta VD2$ indicate perturbation components of the above-described operating conditions.

The observer P4 obtains state estimated variables $\hat{X}$ (k) by estimating state variables X (k) which represent the internal state of the air conditioning apparatus using the perturbation components $\delta TR1$ and $\delta TR2$ of the internal air temperature and the perturbation components $\delta VB1$, $\delta VB2$, $\delta VD1$ and $\delta VD2$ of the above-mentioned operating conditions, and the state estimated variables $\hat{X}$ (k) and the above-mentioned accumulated values ZTR1(k) and ZTR2(k) are multiplied by the optimal feedback gain F in the feedback amount determining portion P5 so as to obtain the controlled variables ($\delta VB1$, $\delta VB2$, $\delta VD1$ and $\delta VD2$). Since the combination of the control variables ($\delta VB1$, $\delta VB2$, $\delta VD1$ and $\delta VD2$) are perturbation components relative to the operating condition corresponding to steady operating condition selected by the perturbation componet extracting portion P3, the variables VB1, VB2, VD1 and VD2 of the operating conditions of the air conditioning apparatus are determined by adding reference setting values VB10, VB20, VD10a and VD20 corresponding to the steady operating condition to the perturbation components by a reference value adding portion P6.

Figure 21:
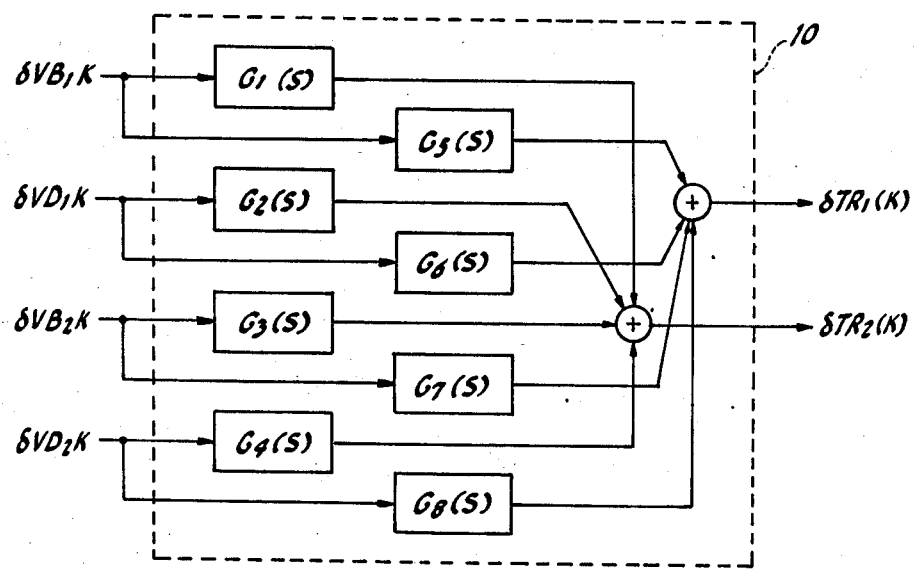
FIG. 21 is a block diagram used for identifying models of the system of the fourth embodiment.

As described in the above, the fourth embodiment air conditioner is constructed as a four-input two-output system. FIG. 21 is a diagram of the fourth embodiment air conditioner operated in a steady state, and the air conditioning system is shown by transfer function G1(z) through G8(z) wherein "z" indicates z-transformation of sampled values of the input/output signals, and it is assumed that G1(z) through G8(z) are of appropriate order. Thus, the entire transfer function matrix G (z) is expressed by:

$$G = \begin{bmatrix} G1(z) & G2(z) & G3(z) & G4(z) \\ G5(z) & G6(z) & G7(z) & G8(z) \end{bmatrix}$$

System parameters A 1' through A 8', B 1' through B 8', C 1' through C 8' are obtained in connection with each of the transfer functions G1(z) through G8(z), and then system parameters of the original multivariable system of four-input and two-output, i.e. vectors A, B, C of the state equation (1) and output equation (2) can be obtained. The Eqs. (14) through (16) described in connection with the first embodiment are modified as follows in the fourth embodiment:

$$P = \begin{bmatrix} P11 & P12 & \ldots & \ldots & P16 \\ P12 & P22 & \ldots & \ldots & P26 \\ \vdots & & & & \vdots \\ P61 & P62 & \ldots & \ldots & P66 \end{bmatrix} \quad (14)''$$

$$M = \begin{bmatrix} M11 & M12 & \ldots & \ldots & M16 \\ M21 & M22 & \ldots & \ldots & M26 \\ \vdots & & & & \vdots \\ M61 & M62 & \ldots & \ldots & M66 \end{bmatrix} \quad (15)''$$

$$\tilde{C} = \begin{bmatrix} 1 & 0 & \ldots & \ldots & 0 \\ 0 & 1 & \ldots & \ldots & \cdot \\ \vdots & & & & \vdots \\ 0 & & \ldots & \ldots & 1 \end{bmatrix} \quad (16)''$$

Therefore, the state estimated variables X (k) are given by:

$$X(k) = [\delta TB11(k), \delta TB12(k), \delta TB21(k), \delta TB22(k), \delta TD11(k), \delta TD12(k), \delta TD21(k), \delta TD22(k)]^T \quad (33)$$

Operations similar to those in the first embodiment are performed to obtain the optimal feedback gain F, and thus controlled variables u (k) of the air conditioner can be obtained as:

$$u(k) = F \cdot [\hat{X}(k) ZTR1(k) ZTR2(k)]^T \quad (24)'$$

By repeating simulation with the weighting parameter matrixes Q and R being altered until an optimal control characteristic is obtained, the optimal feedback gain F is obtained as:

$$F = \begin{bmatrix} F11 & F12 & \ldots & \ldots & F110 \\ F21 & F22 & \ldots & \ldots & F210 \\ F31 & F32 & \ldots & \ldots & F310 \\ F41 & F42 & \ldots & \ldots & F410 \end{bmatrix} \quad (25)''$$

Figure 22A:
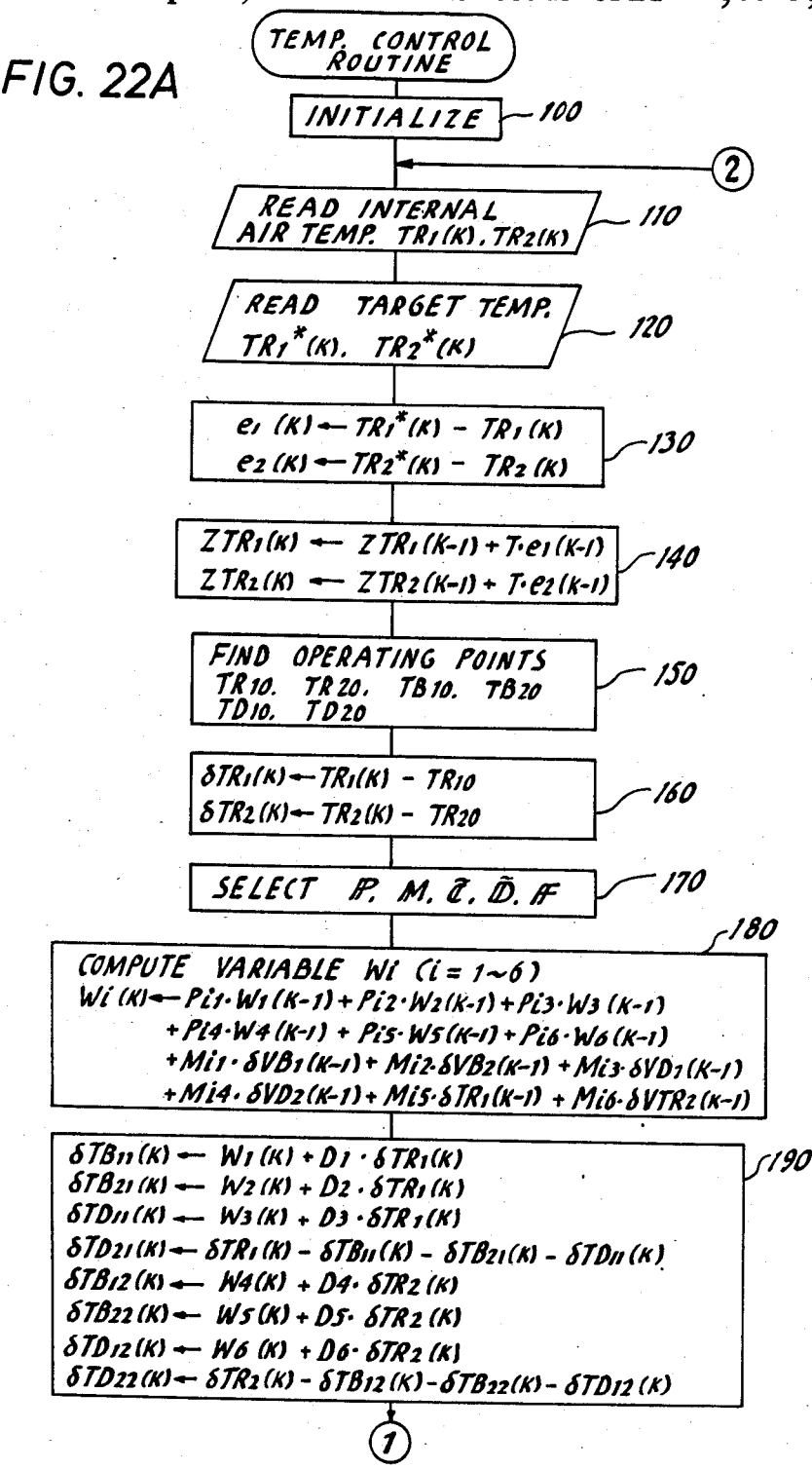

FIGS. 22A and 22B show a flowchart for the operation of the above-mentioned fourth embodiment air conditioner. Although the program shown by way of the flowchart is similar to that of the first embodiment shown in FIG. 7, the above-mentioned two temperatures TR1 and TR2 are respectively controlled in the fourth embodiment, and thus operations are more complex. In detail, in step 130 of the flowchart of FIG. 22A the differences between internal air temperatures TR1(k), TR2(k) and the setting target temperatures TR1*(k), TR2*(k) are given by:

$$e1(k) = TR1*(k) - TR1(k)$$

$$e2(k) = TR2*(k) - TR2(k)$$

Therefore, accumulated values are obtained as follows in step 140:

$$ZTR1(k) = ZTR1(k-1) + T \cdot e1(k-1) \quad (26)'$$

$$ZTR2(k) = ZTR2(k-1) + T \cdot e2(k-1) \quad (26)''$$

In a following step 150, operating points TR10, TR20, VB10, VB20, VD10, VD20 are set in the same manner as in the first embodiment. Then in a following step 160, perturbation components TR1(k) and TR2(k) are obtained respectively in connection with the detected temperatures TR1(k) and TR2(k). A following step 170 corresponds to step 170 of FIG. 7, and in a following step 180, variables $W(k) = [W1(k)\ W2(k)\ W3(k)\ W4(k)\ W5(k)\ W6(k)]^T$ are used to obtain W1(k) through W6(k) using:

$$Wi(k) = Pi1 \cdot W1(k-1) + Pi2 \cdot W2(k-1) + Pi3 \cdot$$

$$W3(k-1) + Pi4 \cdot W4(k-1) + Pi5 \cdot W5(k-1) + Pi6 \cdot$$

$$W6(k-1) + Mi1 \cdot \delta VB1(k-1) + Mi2 \cdot \delta VB2(k-1) + Mi3 \cdot$$

$$\delta VD1(k-1) + Mi4 \cdot \delta VD2(k-1) + Mi5 \cdot \delta TR1(k-1) +$$

$$Mi6 \cdot \delta TR2(k-1)$$

wherein i = 1 to 6.

In a subsequent step 190, state estimated variables are obtained using the above results as follows:

$$\delta TB11(k) = W1(k) + D1 \cdot \delta TR1(k)$$

$$\delta TB21(k) = W2(k) + D2 \cdot \delta TR1(k)$$

$$\delta TD11(k) = W3(k) + D3 \cdot \delta TR1(k)$$

$$\delta TD21(k) = \delta TR1(k) - \delta TB11(k) - \delta TB21(k) - \delta TD11(k)$$

$$\delta TB12(k) = W4(k) + D4 \cdot \delta TR2(k)$$

$$\delta TB22(k) = W5(k) + D5 \cdot \delta TR2(k)$$

$$\delta TD12(k) = W6(k) + D6 \cdot \delta TR2(k)$$

$$\delta TD22(k) = \delta TR2(k) - \delta TB12(k) - \delta TB22(k) - \delta TD12(k)$$

In a following step 200, the perturbation components $\delta VB1(k)$, $\delta VB2(k)$ of the drive voltage of the blower motors 3A and 3B and the perturbation components $\delta VD1(k)$, $\delta VD2(k)$ of the drive voltage of the damper actuator 24 are obtained from the state estimated variables $\hat{X}(k) = [\delta TB11(k) \delta TB12(k) \delta TB21(k) \delta TB22(k) \delta TD11(k) \delta TD12(k) \delta TD21(k) \delta Td22(k)]^T$ obtained in step 180, the accumulated values ZTR1(k), ZTR2(k) obtained in step 140 using the optimal feedback gain F. Equations shown in step 200 of FIG. 22B are expressed in vector form as follows:

$$[\delta VB1(k)\ \delta VB2(k)\ \delta VD1(k)\ \delta VD2(k)]^T =$$

$$F \cdot [TB11(k)\ \delta TB12(k)\ \delta TB21(k)\ \delta TB22(k)$$

$$\delta TD11(k)\ \delta TD12(k)\ \delta TD21(k)\ \delta TD22(k)\ ZTR1(k)\ ZTR2(k)]^T$$

This processing corresponds to the feedback amount determining portion P5 of FIG. 20.

In a following step 210, actual drive voltages VB1(k), VB2(k), VD1(k), VD2(k) are obtained by adding values VB10, VB20, VD10, VD20 at operating points to the perturbation components VB1(k), VB2(k), VD1(k), VD2(k) of respective drive voltages obtained in step 200. This processing corresponds to the reference value adding portion P6 of FIG. 20.

In a following step 220, respective drive voltages VB1(k), VB2(k), VD1(k), VD2(k) obtained in step 210 are outputted via the output port 38 to the blower motors 3A and 3B, and the damper actuators 24A and 24B. In a step 230, the value of subscript k indicating the number of times of sampling/operation/control is incremented by 1 to return to step 110 so as to repeat the processing of steps 110 through 230.

Figure 23A:
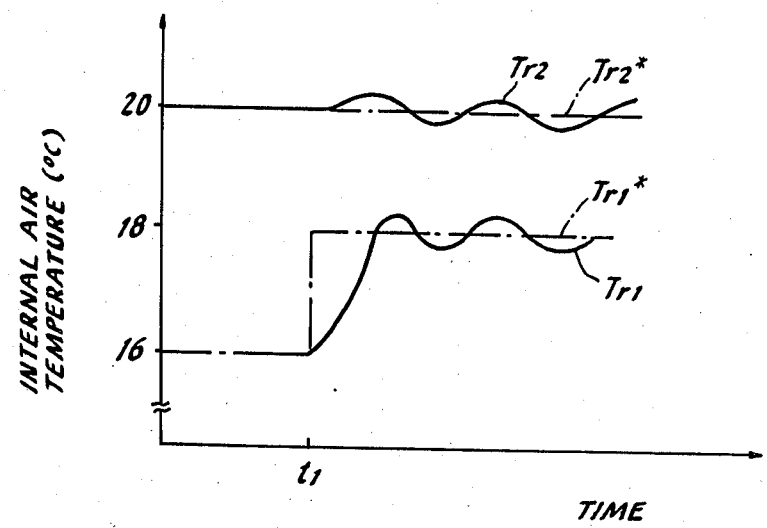
FIGS. 23A and 23B are graphs showing the state of variation of the intenal air temperature when the setting target temperature has been changed in the fourth embodiment.
Figure 23B:
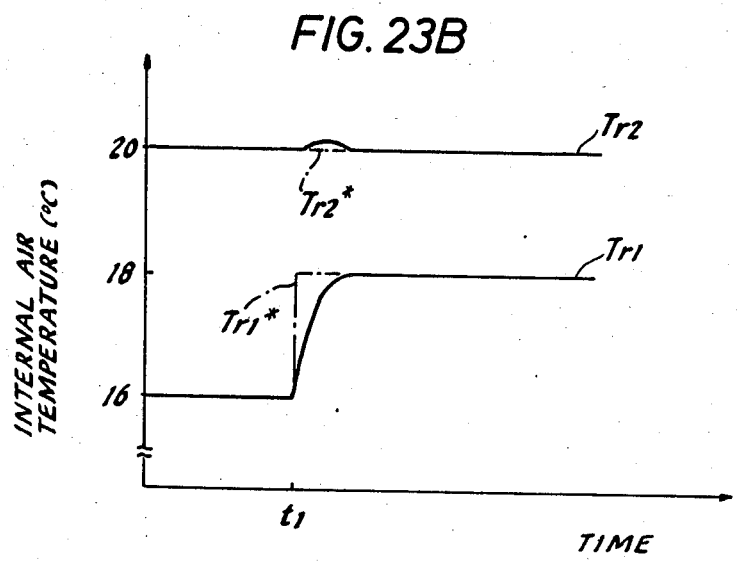

The example of the control according to the present control routine of the fourth embodiment formed as described in the above, is shown in FIGS. 23A and 23B in comparison with a conventional example of simple feedback control. FIG. 23A shows the variation in actual temperatures at the front and rear portions of the vehicle compartment where the temperature control is performed by conventional feedback control, while FIG. 23B shows the variation of the same according to the feedback control by the fourth embodiment. In these graphs, dot-dash curves TR1 and TR2 indicate setting target temperatures respectively set by the temperature setters 14A and 14B, and solid curves TR1 and TR2 indicate actual temperatures detected by temperature sensors 12A and 12B. FIG. 23A and 23B show a state where the target temperatures TR1 and TR2 are respectively set to 16° C. and 20° C. first, and then only the target temperature TR1 is raised by 2° C. to 18° C. at time t1.

As will be understood from the comparison between FIGS. 23A and 23B, the internal air temperatures suffer from hunting phenomena due to interference between front air temperature and rear air temperature within the vehicle compartment, and thus the response and stability of the control is poor. On the other hand, when the fourth embodiment is used, no such undesirable hunting occurs thereby providing quick response and high stability. Furthermore, since the blower motors 3A and 3B as well as the damper actuators 24A and 24B are controlled optimally, loss in energy can be effectively reduced.

As described in detail, according to the air conditioner for the automobile of the present invention, there is a superior advantage that the temperature within the vehicle compartment (intenal air temperature) can be controlled with a high response characteristic and high follow-up characteristic. Furthermore, it is possible to optimally control variables including at least airflow rate and temperature of the air blown off into the vehicle compartment with negligibly small over control (overshooting and undershooting) in the control of internal air temperature. Therefore, it is possible to minimize the load of the prime mover of the air conditioner of automobile, and thus there is an advantage that fuel cost can be reduced when an air conditioner is driven by an internal combustion engine. Moreover, there is a secondary advantage that the process of designing and development of an air conditioner can be reduced.

Particularly, in the second embodiment since the environmental condition including solar radiation amount is detected so as to change the internal variables including the optimal feedback gain of the integral-added optimal regulator, superior control can be achieved such that vehicle compartment temerature control can be effected with high stability even if the environmental condition, such as solar radiation amount, changes.

In the third embodiment, which is a modification of the second embodiment, the environmental condition including solar radiation amount is also detected to perform feedforward control with an integral-added optimal regulator. Therefore, the temperature within the vehicle compartment can be controlled with high stability even though environmental condition, such as solar radiation amount, has changed.

Moreover, in the fourth embodiment of the present invention, since temperatues at a plurality of places within a vehicle compartment are respectively detected so that these temperatures are controlled within suffering from interference between a plurality of air conditioned airflows at these plurality of places.

The above-described embodiments are just examples of the present invention, and therefore, it will be apparent to those skilled in the art that many modifications that variations may be made without departing from the scope of the present invention.

What is claimed is:

1. An air conditioner for a vehicle, comprising:
   (a) air duct means for supplying a vehicle compartment with air;
   (b) supply heat quantity controlling means for controlling an amount of heat of the air supplied from said air duct means to said vehicle compartment;
   (c) temperature setting means for setting a target temperature for air in said vehicle compartment;
   (d) compartment temperature detecting means for detecting an actual temperature of air in said vehicle compartment as a detected compartment temperature;
   (e) deviation computing means for computing the temperature deviation of said detected compartment temperature from said target temperature;
   (f) temperature perturbation component computing means for computing perturbation components of said detected compartment temperature relative to a reference temperature of said vehicle compartment under a steady air-conditioning state in a dynamic model used for controlling said heat quantity which is predetermined through system identification;
   (g) internal state estimating means for estimating an estimated internal state of said dynamic model using said perturbation components computed by said temperature perturbation component computing means;
   (h) adjusting amount perturbation component computing means for computing adjusting amount perturbation components of said supply heat quantity controlling means relative to a reference adjusting amount under said steady air-conditioning state in said dynamic model on the basis of said temperature deviation computed by said deviation computing means and said estimated internal state of said internal state estimating means; and
   (i) control adjusting amount determining means for determining an adjusting amount of said amount of heat of air on the basis of said adjusting amount perturbation components and said reference adjusting amount.

2. An air conditioner as claimed in claim 1, wherein said supply heat quantity controlling means is also for to controlling: (a) the amount of air fed from said air duct means to said vehicle compartment, (b) capability of cooling the air within said air duct means, and (c) the degree of reheating cooled air.

3. An air conditioner as claimed in claim 1, wherein said temperature perturbation component computing means comprises dynamic model selecting means for selecting a dynamic model that satisfies linear approximation in accordance with the deviation of detected compartment temperature, said dynamic model selecting means computing a reference compartment temperature under said steady air-conditioning state in a selected dynamic model.

4. An air conditioner as claimed in claim 1, wherein said internal state estimating means is also for computing a state estimation value indicative of an internal state of said dynamic model, on the basis of said adjusting amount perturbation components and said temperature perturbation components.

5. An air conditioner as claimed in claim 1, wherein said adjusting amount perturbation component computing means comprises integrator means for integrating said temperature deviation to provide an integrated temperature difference, and feedback amount computing means for computing said adjusting amount perturbation component on the basis of said integrated temperature difference from said integrator means, said estimated internal state obtained by said internal state estimating means, and an optimal feedback gain for causing said compartment temperature with said dynamic model to approach said target temperature.

6. An air conditioner as claimed in claim 3, wherein said adjusting amount perturbation component computing means comprises integrator means for integrating said temperature deviation to provide an integrated temperature difference, and feedback amount computing means for computing said adjusting amount perturbation component on the basis of said integrated temperature difference from said integrator means, said estimated internal state obtained by said internal state estimating means, and an optimal feedback gain for causing said compartment temperature with said dynamic model to approach said target temperature, said feedback amount computing means comprising feedback gain determining means for determining said optimal feedback gain in accordance with said dynamic model selected by said dynamic model selecting means.

7. An air conditioner for a vehicle, comprising:
   (a) air duct means for supplying a vehicle compartment with air;
   (b) supply heat quantity controlling means for controlling a quantity of heat of air supplied from said air duct means to said vehicle compartment;
   (c) temperature setting means for setting a target temperature for air in said vehicle compartment;
   (d) compartment temperature detecting means for detecting an actual detected temperature of air in said vehicle compartment;
   (e) deviation computing means for computing a temperature deviation of said detected temperature in said compartment from said target temperature;
   (f) air-conditioning environmental condition detecting means for detecting an environmental condition having an influence on the change of said compartment air temperature;
   (g) temperature perturbation component computing means for computing perturbation components of said detected compartment temperature relative to a reference temperature of said vehicle compartment under a steady air-conditioning state in a dynamic model used for controlling said heat quantity which is predetermined through system identification;

(h) internal state estimating means for estimating the internal state of said dynamic model as an estimated internal state using the detected air-conditioning environmental condition said perturbation components computed by said temperature perturbation component computing means;

(i) adjusting amount perturbation component computing means for computing adjusting amount perturbation components of said supply heat quantity controlling means relative to a reference adjusting amount under said steady air-conditioning state in said dynamic model on the basis of said temperature deviation computed by said deviation computing means, said detected air-conditioning environmental condition, and said estimated internal state from said internal state estimating means; and (j) control adjusting amount determining means for determining an adjusting amount of said supply heat quantity on the basis of said adjusting amount perturbation components and said reference adjusting amount.

8. An air conditioner as claimed in claim 7, wherein said supply heat quantity controlling means is also for controlling: (a) the amount of air fed from said air duct means to said vehicle compartment, (b) a capability of cooling the air within said air duct means, and (c) the degree of reheating cooled air.

9. An air conditioner as claimed in claim 7, wherein said internal state estimating means is also for computing a state estimation value indicative of said internal state of said dynamic model on the basis of said air-conditioning environmental condition, said adjusting amount perturbation components, and said temperature perturbation components.

10. An air conditioner as claimed in claim 7, wherein said temperature perturbation component computing means comprises dynamic model selecting means for selecting a dynamic model which satisfies linear approximation in accordance with the change of detected compartment temperature, said dynamic model selecting means computing a reference compartment temperature under said steady air-conditioning state in a selected dynamic model.

11. An air conditioner as claimed in claim 7, wherein said adjusting amount perturbation component computing means comprises integrator means for integrating said temperature deviation to produce an integrated temperature difference, and feedback amount computing means for computing said adjusting amount perturbation component on the basis of said integrated temperature difference from said integrator means, said estimated internal state from said internal state estimating means, said air-conditioning environmental condition, and an optimal feedback gain for causing said compartment temperature with said dynamic model to approach said target temperature.

12. An air conditioner as claimed in claim 10, wherein said adjusting amount perturbation component computing means comprises integrator means for integrating said temperature deviation to produce an integrated temperature difference, and feedback amount computing means for computing said adjusting amount perturbation component on the basis of saod integrated temperature difference from said integrator means, said estimated internal state from said internal state estimating means, said air-conditioning environmental condition, and an optimal feedback gain for causing said compartment temperature with said dynamic model to approach said target temperature, said feedback amount computing means comprising feedback gain determining means for determining said optimal feedback gain in accordance with said dynamic model selected by said dynamic model selecting means, and said air-conditioning environmental condition.

13. An air conditioner as claimed in claim 7, wherein said adjusting amount perturbation component computing means comprises integrator means for integrating said temperature deviation to produce an integrated temperature difference; feedback amount computing means for computing said adjusting amount perturbation component on the basis of said integrated temperature difference from said integrator means, said estimated internal state from internal state estimating means, and an optimal feedback gain, for causing said compartment temperature with said dynamic model to approach said target temperature; and feedforward amount computing means for computing a feedforward gain according to said dynamic model and for computing a feedforward amount to be added to said adjusting amount perturbation component computed by said feedback amount computing means on the basis of said feedforward gain.

14. An air conditioner as claimed in claim 7, wherein said air-conditioning environmental condition detecting means is arranged to detect at least one of amount of solar radiation, exterior temperature, humidity, vehicle speed, and speed of the engine of said vehicle.

15. An air conditioner for a vehicle, comprising:

(a) air duct means for supplying a vehicle compartment with air through a plurality of air outlets to blow air toward a plurality of positions in said vehicle compartment;

(b) supply heat quantity controlling means for controlling the quantity of heat of air supplied from said air duct means to said vehicle compartment;

(c) temperature setting means for setting a target temperature for air in said vehicle compartment;

(d) compartment temperature detecting means for detecting actual detected temperatures of air at said plural positions in said vehicle compartment;

(e) deviation computing means for computing a temperature deviation of a detected compartment temperature from said target temperature for each of said temperatures at said plural positions;

(f) temperature perturbation component computing means for computing respective perturbation components of said detected compartment temperatures at said plural positions relative to a plurality of reference temperatures for said plural positions in said vehicle compartment under a steady air-conditioning state in a dynamic model used for controlling said heat quantity which is predetermined through system identification;

(g) internal state estimating means for estimating the internal state of said dynamic model as an estimated internal state using said perturbation components computed by said temperature perturbation component computing means;

(h) adjusting amount perturbation component computing means for computing adjusting amount perturbation components of said supply heat quantity controlling means relative to a reference adjusting amount under said steady air-conditioning state in said dynamic model on the basis of said temperature deviation computed by said deviation computing means and said estimated internal state; and (i) control adjusting amount determining means for determining an adjusting amount of said supply heat quantity on the basis of said adjusting amount perturbation components and said reference adjusting amount.

16. An air conditioner as claimed in claim 15, wherein said supply heat quantity controlling means is also for controlling (a) an amount of air fed from said air duct means to said vehicle compartment, (b) a capability of cooling the air within said air duct means, and (c) the degree of reheating cooled air.

17. An air conditioner as claimed in claim 15, wherein said temperature perturbation component computing means comprises dynamic model selecting means for selecting a dynamic model satisfies linear approximation in accordance with the deviation of detected compartment temperature, said dynamic model selecting means computing a reference compartment temperature under said steady air-conditioning state in a selected dynamic model.

18. An air conditioner as claimed in claim 15, wherein said internal state estimating means is arranged to compute a state estimation value indicative of said internal state of said dynamic model on the basis of said adjusting amount perturbation components and said temperature perturbation components.

19. An air conditioner as claimed in claim 15, wherein said adjusting amount perturbation component computing means comprises integrator means for respectively integrating said temperature deviations to produce an integrated temperature difference, and feedback amount computing means for computing said adjusting amount perturbation component on the basis of said integrated temperature difference from said integrator means, said estimated internal state from said internal state estimating means, and an optimal feedback gain for causing said compartment temperature with said dynamic model to approach said target temperature.

* * * * *